US012641691B2

(12) United States Patent
Biery et al.

(10) Patent No.: US 12,641,691 B2
(45) Date of Patent: May 26, 2026

(54) SYSTEMS AND METHODS FOR CONTROLLING COLOR TEMPERATURE

(71) Applicant: Lutron Technology Company LLC, Coopersburg, PA (US)

(72) Inventors: Ethan Charles Biery, Orefield, PA (US); Craig Alan Casey, Coopersburg, PA (US); Venkatesh Chitta, Center Valley, PA (US); Brent Protzman, Easton, PA (US); Thomas M. Shearer, Macungie, PA (US); Mark S. Taipale, Harleysville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 19/012,466

(22) Filed: Jan. 7, 2025

(65) Prior Publication Data

US 2025/0151182 A1 May 8, 2025

Related U.S. Application Data

(63) Continuation of application No. 17/986,472, filed on Nov. 14, 2022, now Pat. No. 12,219,676, which is a (Continued)

(51) Int. Cl.
*H05B 45/20* (2020.01)
*H05B 45/22* (2020.01)
*H05B 47/19* (2020.01)

(52) U.S. Cl.
CPC ............ *H05B 45/20* (2020.01); *H05B 45/22* (2020.01); *H05B 47/19* (2020.01)

(58) Field of Classification Search
None
See application file for complete search history.

(56) References Cited

U.S. PATENT DOCUMENTS 7,391,297 B2 6/2008 Cash et al.
8,009,042 B2 8/2011 Steiner et al.
(Continued)

FOREIGN PATENT DOCUMENTS

CN 103687188 A 3/2014

OTHER PUBLICATIONS

S. Afshari and S. Mishra, "An optimization framework for control of non-square smart lighting systems with saturation constraints," 2015 American Control Conference (ACC), Chicago, IL, USA, 2015, pp. 1665-1670, doi: 10.1109/ACC.2015.7170972. (Year: 2015).*
(Continued)

*Primary Examiner* — Laura Yesildag
(74) *Attorney, Agent, or Firm* — Michael S. Czarnecki; Glen R. Farbanish; Philip N. Smith

(57) ABSTRACT

Methods and systems may be used to control the output parameters of one or more light sources (e.g., discrete-spectrum light sources) based on fixture capability information. Fixture capability information may be obtained using a configuration tool. The fixture capability information may be determined by the configuration tool, and the fixture capability information determined by the configuration tool may be stored and/or processed. The fixture may have a memory for storing the fixture capability information. The fixture capability information may also be stored in a remote network device. A system controller may obtain the fixture capability information from the fixture or the remote control device. The system controller may generate control instructions based on the fixture capability information and send the control instructions to the fixtures.

24 Claims, 22 Drawing Sheets

Related U.S. Application Data continuation of application No. 17/081,981, filed on Oct. 27, 2020, now Pat. No. 11,503,682, which is a continuation of application No. 16/543,038, filed on Aug. 16, 2019, now Pat. No. 10,827,578, which is a continuation of application No. 15/832,716, filed on Dec. 5, 2017, now Pat. No. 10,420,185.

(60) Provisional application No. 62/430,310, filed on Dec. 5, 2016.

(56) References Cited

U.S. PATENT DOCUMENTS

| | | | | |
|---|---|---|---|---|
| 8,199,010 | B2 | 6/2012 | Sloan et al. | |
| 8,228,184 | B2 | 7/2012 | Blakeley et al. | |
| 8,410,706 | B2 | 4/2013 | Steiner et al. | |
| 8,451,116 | B2 | 5/2013 | Steiner et al. | |
| 8,760,074 | B2 | 6/2014 | Raj et al. | |
| 8,950,461 | B2 | 2/2015 | Ogden, Jr. et al. | |
| 8,981,672 | B2 | 3/2015 | Krause | |
| 9,155,155 | B1 | 10/2015 | Ho et al. | |
| 9,237,612 | B1 | 1/2016 | Lewis et al. | |
| 9,237,623 | B1 | 1/2016 | Lewis et al. | |
| 9,247,605 | B1 | 1/2016 | Ho et al. | |
| 9,332,598 | B1 | 5/2016 | Ho et al. | |
| 9,345,097 | B1 | 5/2016 | Ho et al. | |
| 9,485,813 | B1 | 11/2016 | Lewis et al. | |
| 9,578,724 | B1 | 2/2017 | Knapp et al. | |
| 10,027,127 | B2 | 7/2018 | Crafts et al. | |
| 2007/0018795 | A1 | 1/2007 | Harwood et al. | |
| 2008/0092075 | A1 | 4/2008 | Jacob et al. | |
| 2008/0224708 | A1 | 9/2008 | Mannerfelt | |
| 2008/0265799 | A1 * | 10/2008 | Sibert .................... | H05B 47/12 315/292 |
| 2011/0089866 | A1 | 4/2011 | Trotter et al. | |
| 2011/0215736 | A1 | 9/2011 | Horbst et al. | |
| 2012/0206050 | A1 | 8/2012 | Spero | |
| 2013/0030589 | A1 | 1/2013 | Pessina et al. | |
| 2013/0063042 | A1 | 3/2013 | Bora et al. | |
| 2013/0214704 | A1 | 8/2013 | Gerlach et al. | |
| 2014/0070707 | A1 | 3/2014 | Nagazoe et al. | |
| 2014/0184101 | A1 * | 7/2014 | Verbrugh ............... | H05B 45/20 315/297 |
| 2014/0305602 | A1 | 10/2014 | Kirby et al. | |
| 2014/0312777 | A1 | 10/2014 | Shearer et al. | |
| 2015/0237688 | A1 | 8/2015 | Gambeski et al. | |
| 2015/0257241 | A1 * | 9/2015 | Krause ................. | H05B 47/165 315/297 |
| 2015/0377695 | A1 | 12/2015 | Chang et al. | |
| 2015/0377699 | A1 | 12/2015 | Ho et al. | |
| 2015/0382422 | A1 | 12/2015 | Ho et al. | |
| 2015/0382424 | A1 | 12/2015 | Knapp et al. | |
| 2015/0382425 | A1 | 12/2015 | Lewis et al. | |
| 2016/0050734 | A1 * | 2/2016 | Bewick ................ | H05B 39/042 315/153 |
| 2016/0066383 | A1 | 3/2016 | Dias et al. | |
| 2016/0066384 | A1 | 3/2016 | Dias et al. | |
| 2016/0113094 | A1 | 4/2016 | Burt et al. | |
| 2016/0183344 | A1 | 6/2016 | Chitta et al. | |
| 2016/0261840 | A1 | 9/2016 | Nakashima | |
| 2016/0302288 | A1 | 10/2016 | Ando et al. | |
| 2017/0105260 | A1 | 4/2017 | Ho et al. | |
| 2017/0127485 | A1 | 5/2017 | Hsia | |
| 2017/0153012 | A1 | 6/2017 | Boleko Ribas et al. | |
| 2017/0202071 | A1 | 7/2017 | Chen et al. | |
| 2018/0116029 | A1 | 4/2018 | Pyshos et al. | |
| 2019/0266977 | A1 * | 8/2019 | Ward .................. | G09G 3/3208 |

OTHER PUBLICATIONS

M. Miki, E. Asayama and T. Hiroyasu, “Intelligent Lighting System using Visible-Light Communication Technology,” 2006 IEEE Conference on Cybernetics and Intelligent Systems, Bangkok, Thailand, 2006, pp. 1-6, doi: 10.1109/ICCIS.2006.252257. (Year: 2006).*

L. Archana, M. Yasin and R. Bhagya, “DALI based light and motor control system for movable spot luminaires,” 2017 IEEE International Conference on Smart Technologies and Management for Computing, Communication, Controls, Energy and Materials (ICSTM), Chennai, India, 2017, pp. 433-437. (Year: 2017).*

M. Haraguchi, T. Abe, S. Tanase, M. Inoue and H. Kanayama, “Adaptive color conversion algorithm to achieve both brightness and wide color gamut,” 2009 Digest of Technical Papers International Conference on Consumer Electronics, 2009, pp. 1-2, doi: 10.1109/ICCE.2009.5012292. (Year: 2009).

L. Torok, S. Bechzkowski, S. Munk-Nielsen, J. Gadegaard, T. Kari and K. Pedersen, “High output LED-based profile lighting fixture,” IECON 2011—37th Annual Conference of the IEEE Industrial Electronics Society, 2011, pp. 2941-2946, doi: 10.1109/IECON.2011.6119777. (Year: 2011).

L. Lohaus, E. Leicht, S. Dietrich, R. Wunderlich and S. Heinen, “Advanced color control for multicolor LED illumination systems with parametric optimization,” IECON 2013—39th Annual Conference of the IEEE Industrial Electronics Society, 2013, pp. 3305-3310, dol: 10.1109/IECON.2013.6699658. (Year: 2013).

I. Chew, V. Kalavally, C. P. Tan and J. Parkkinen, “A Spectrally Tunable Smart LED Lighting System With Closed-Loop Control,” in IEEE Sensors Journal, vol. 16, No. 11, pp. 4452-4459, Jun. 1, 2016, doi: 10.1109/JSEN.2016.2542265. (Year: 2016).

S. Afshari and S. Mishra, “A Plug-and-Play Realization of Decentralized Feedback Control for Smart Lighting Systems,” in IEEE Transactions on Control Systems Technology, vol. 24, No. 4, pp. 1317-1327, Jul. 2016, doi: 10.1109/TCST.2015.2487880. (Year: 2016).

AW. Louw and C. Neethling, “Digital LED lighting solutions,” 2013 Proceedings of the 21st Domestic Use of Energy Conference, Cape Town, South Africa, 2013, pp. 1-4. (Year: 2013).

I. Chew, V. Kalavally, C. P. Tan and J. Parkkinen, “A Spectrally Tunable Smart LED Lighting System With Closed-Loop Control,” in IEEE Sensors Journal, vol. 16, No. 11, pp. 4452-4459, June1, 2016, doi: 10.1109/JSEN.2016.2542265. (Year: 2016).

M. F. Braga, F. J. Nogueira, M. F. C. Campos, L. H. B. Gouveia and H. A. C. Braga, “A comparative study regarding linear fluorescent and LED lamps for indoor lighting,” 2014 11th IEEE/IAS International Conference on Industry Applications, Juiz de Fora, Brazil, 2014, pp. 1-7 (Year: 2014).

M. Fischer, K. Wu and P. Agathoklis, “Intelligent Illumination Model-Based Lighting Control,” 2012 32nd International Conference on Distributed Computing Systems Workshops, Macau, China, 2012, pp. 245-249, doi: 10.1109/ICDCSW.2012.75. (Year: 2012).

J. L. F. Barbosa, W. P. Calixto and D. Simon, “High power LED luminaire design optimization,” 2016 IEEE 16th International Conference on Environment and Electrical Engineering (EEEIC), Florence, Italy, 2016, pp. 1-6, doi: 10.1109/EEEIC.2016.7555587. (Year: 2016).

* cited by examiner

SYSTEMS AND METHODS FOR CONTROLLING COLOR TEMPERATURE

CROSS-REFERENCE TO RELATED APPLICATIONS

This application is a continuation of U.S. patent application Ser. No. 17/986,472 filed Nov. 14, 2022; which is a continuation of U.S. patent application Ser. No. 17/081,981 filed Oct. 27, 2020, now U.S. Pat. No. 11,503,682 issued Nov. 15, 2022; which is a continuation of U.S. patent application Ser. No. 16/543,038, filed Aug. 16, 2019, now U.S. Pat. No. 10,827,578 issued Nov. 3, 2020; which is a continuation of U.S. patent application Ser. No. 15/832,716, filed Dec. 5, 2017, now U.S. Pat. No. 10,420,185 issued Sep. 17, 2019, which claims the benefit of U.S. Provisional Patent Application No. 62/430,310, filed Dec. 5, 2016, the disclosures of which are incorporated herein by reference in their entireties.

BACKGROUND

Traditional sources of light such as the sun as well as incandescent and halogen lamps may exhibit the characteristics of a black body radiator. Such light sources typically emit a relatively continuous-spectrum of light, and the continuous emissions range the entire bandwidth of the visible light spectrum (e.g., light with wavelengths between approximately 390 nm and 700 nm). The human eye has grown accustomed to operating in the presence of black body radiators and has evolved to be able to distinguish a large variety of colors when emissions from a black body radiator are reflected off of an object of interest. Various wavelengths/frequencies of the visible light spectrum may be associated with a given "color temperature" of a black body radiator.

Non-incandescent light sources such as fluorescent lights (e.g., compact fluorescent lights or CFLs) and light emitting diodes (LEDs) have become more widely available due to their relative power savings as compared to traditional incandescent lamps. Typically light from CFLs or LEDs does not exhibit the properties of a black body radiator. Instead, the emitted light is often more discrete in nature due to the differing mechanisms by which CFLs and/or LEDs generate light as compared to an incandescent or halogen light bulbs. Since fluorescents and LEDs do not emit relatively constant amounts of light across the visible light spectrum (e.g., instead having peaked intensities at one or more discrete points within the visible spectrum), fluorescents and LEDs are often referred to as discrete-spectrum light sources.

SUMMARY

As described herein, a load control system may include a plurality of lighting fixtures that may be controlled to adjust the intensity and/or color (e.g., color temperature) of the light emitted by the lighting fixtures. The load control system may include a system controller that receives fixture capability information for one or more of the lighting fixtures in a space (e.g., a room). For example, the fixture capability information may include one or more fixture capability metrics for one or more operating parameters of the lighting fixtures, such as a dimming range, a color temperature range, a maximum color temperature, a minimum color temperature, a color gamut, a spectral power distribution, a power range, a dimming curve, a color mixing curve, a color temperature curve, maximum and minimum lumen outputs per internal light source, power consumption per internal light source, or other fixture capability metrics. The system controller may establish room capability information based on the fixture capability information received from the lighting fixtures in the space, and control the lighting fixtures based on the established room capability information.

The system controller may receive the fixture capability information during commissioning of the load control system. The fixture capability information for a specific lighting fixture may be determined using a measurement tool during manufacturing of the lighting fixture, and stored in memory in the lighting fixture. In addition, the fixture capability information may be stored in memory in a remote network device (e.g., a cloud server), and a label having an identifier associated with the fixture capability information for that lighting fixture may be affixed to the lighting fixture. The system controller may transmit a request for the fixture capability information and receive the fixture capability information from the lighting fixture and/or the remote network device during commissioning. Further, the system controller may receive the fixture capability information from a measurement tool (e.g., a measurement sensor) after installation of the lighting fixture.

During normal operation, the system controller may determine control instructions for controlling the lighting fixtures using the established room capability information. The system controller may establish the room capability information by determining a room color temperature range and/or a room color gamut to which the system controller may limit the color and/or color temperature of the lighting fixtures in the room. The system controller may determine a room color mixing curve according to which the lighting fixtures in the room may operate. The system controller may dynamically update the room capability information based on which lighting fixtures are presently on. The system controller may turn off low-performing lighting fixtures to improve room capability metrics of the room capability information.

DETAILED DESCRIPTION

A lighting device may be controlled to achieve many factors. The factors may include Melanopic Lux, Circadian Stimulus (CS), vividness, naturalness, color rending index (CRI), correlated color temperature (CCT), red saturation, blue saturation, green saturation, color preference, color discrimination, illuminance/intensity, efficacy, and/or correction for color deficiencies (e.g., red-green color blindness).

Figure 1:
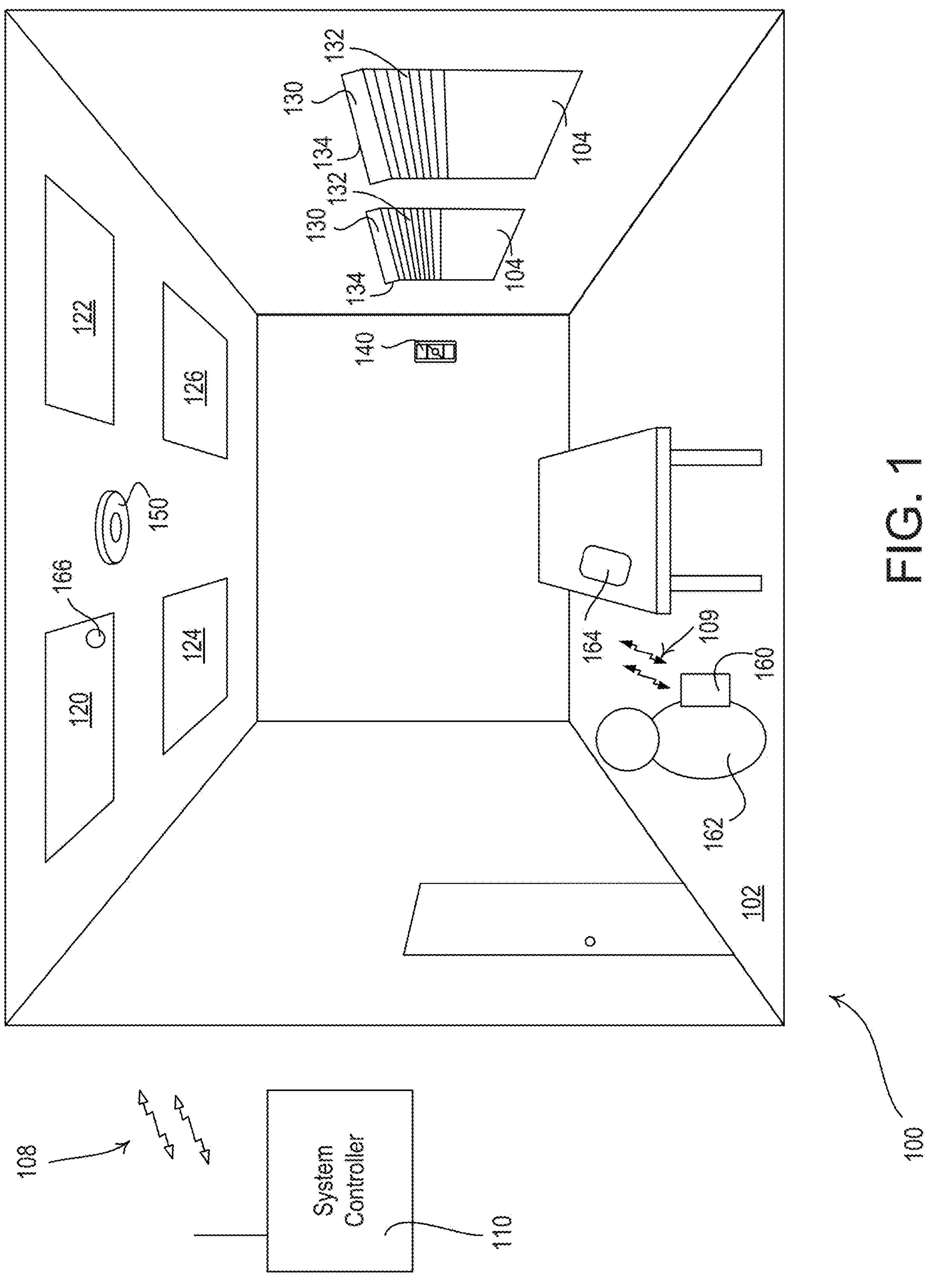
FIG. 1 depicts an example load control system for controlling color of one or more lighting fixtures.

FIG. 1 is a simple diagram of an example load control system 100 for controlling color of one or more load control devices (e.g., lighting loads installed in lighting fixtures 120-126). The load control system 100 may be installed in one or more rooms 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. Additionally, or alternatively, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The system controller may also directly control control-target devices without receiving messages from control-source devices, such as in response to time-clock schedules. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The control-target devices in the load control system 100 may comprise one or more remotely-located load control devices, such as light-emitting diode (LED) drivers (not shown) that may be installed in the lighting fixtures 120-126 for controlling the respective lighting loads (e.g., LED light sources and/or LED light engines). The LED drivers may be located in or adjacent to the lighting fixtures 120-126. The LED drivers may be configured to receive digital messages such as via the RF signals 108 (e.g., from the system controller 110) and to control the respective LED light sources in response to the received digital messages. The LED drivers may be configured to adjust intensities of the respective LED light sources in response to the received digital messages to adjust an intensity and/or a color (e.g., a color temperature) of the cumulative light emitted by the respective lighting fixtures 120-126. The LED drivers may attempt to control the color temperature of the cumulative light emitted by the lighting fixtures 120-126 along a black body radiator curve on the chromaticity coordinate system. Examples of LED drivers configured to control the color temperature of LED light sources are described in greater detail in commonly-assigned U.S. Patent Application Publication No. 2014/0312777, filed Oct. 23, 2014, entitled SYSTEMS AND METHODS FOR CONTROLLING COLOR TEMPERATURE, the entire disclosure of which is hereby incorporated by reference. Other example LED drivers configured to control the color temperature of LED light sources may also be used in load control system 100. The load control system 100 may further comprise other types of remotely-located load control devices, such as, for example, electronic dimming ballasts for driving fluorescent lamps.

The load control system 100 may comprise one or more daylight control devices, e.g., motorized window treatments 130, such as motorized cellular shades, for controlling the amount of daylight entering the room 102. Each motorized window treatments 130 may comprise a window treatment fabric 132 hanging from a headrail 134 in front of a respective window 104. Each motorized window treatment 130 may further comprise a motor drive unit (not shown) located inside of the headrail 134 for raising and lowering the window treatment fabric 132 for controlling the amount of daylight entering the room 102. The motor drive units of the motorized window treatments 130 may be configured to receive digital messages via the RF signals 108 (e.g., from the system controller 110) and adjust the position of the respective window treatment fabric 132 in response to the received digital messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference. Other example motorized window treatments may also be used in load control system 100.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as one or more remote control devices 140 and/or one or more sensors 150 (e.g., visible light sensors). The input devices may be fixed or movable input devices. The system controller 110 may be configured to transmit one or more digital messages to the load control devices (e.g., the LED drivers in the lighting fixtures 120-126, and/or the motorized window treatments 130) in response to the digital messages received from the remote control device 140 and the sensor 150. The remote control device 140 and/or the sensor 150 may be configured to transmit digital messages directly to the LED drivers of lighting fixtures 120-126, and/or the motorized window treatments 130.

The remote control device 140 may be configured to transmit digital messages via the RF signals 108 to the system controller 110 (e.g., directly to the system controller) in response to an actuation of one or more buttons of the remote control device. The digital messages may include commands for adjusting the intensity, color, and/or color temperature of the lighting fixtures 120-126. For example, the remote control device 140 may be battery-powered.

The sensor 150 may transmit digital messages that include information regarding occupancy and/or vacancy in the room 102, and/or the intensity and/or the color temperature of the illumination in the room 102 (e.g., as a value or an image). The sensor 150 may be installed externally or inside any of the lighting fixtures 120-126. The system controller 110 may control the intensity and/or the color temperature of the light emitted by the lighting fixtures 120-126 based on the occupancy conditions detected by the sensor 150 and/or the light intensity measured by the sensor 150. Again, the load control system 100 may include a single sensor or multiple sensors with each configured to detect any of occupancy and/or vacancy in the room 102, the intensity of the illumination in the room, and/or the color temperature of the illumination in the room.

For example, the sensor 150 may be configured to measure a light intensity in the room 102 (e.g., may operate as a daylight sensor). The sensor 150 may transmit digital messages including the measured light intensity via the RF signals 108 for controlling the lighting fixtures 120-126 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference. Other example daylight sensors may also be used in load control system 100.

The sensor 150 may be configured to detect occupancy and/or vacancy conditions in the room 102 (e.g., may operate as an occupancy and/or vacancy sensor). The occupancy sensor 150 may transmit digital messages to load control devices via the RF communication signals in response to detecting the occupancy or vacancy conditions. The system controller 110 may be configured to turn the lighting fixtures 120-126 on and off in response to receiving an occupied command and a vacant command, respectively. The sensor 150 may operate as a vacancy sensor, such that the lighting fixtures 120-126 are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference. Other example occupancy and/or vacancy sensors may also be used in load control system 100.

The sensor 150 may also be configured to measure a color (e.g., measure a color temperature) of the light emitted by one or more of the lighting fixtures 120-126 in the room 102 (e.g., to operate as a color sensor and/or a color temperature sensor). The sensor 150 may transmit digital messages (e.g., including the measured color temperature) to the system controller 110 via the RF signals 108 for controlling the color (e.g., the color temperatures) of the lighting fixtures 120-126 in response to the measured color temperature (e.g., color tuning of the light in the room). An example of a load control system for controlling the color temperatures of one or more lighting loads is described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference. Other example color sensors may also be used in load control system 100.

The sensor 150 may comprise a camera directed into the room 102. The sensor 150 may be configured to process images recorded by the camera and transmit one or more digital messages to the load control devices in response to the images (e.g., in response to one or more sensed environmental characteristics determined from the images). The sensor 150 may transmit digital messages to the system controller 110 via the RF signals 108 (e.g., using the proprietary protocol) in response to detecting a change in color temperature. The sensor 150 may comprise a first communication circuit for transmitting and receiving the RF signals 108 using the proprietary protocol.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 160, such as, a personal computing device and/or a wearable wireless device. The mobile device 160 may be located on an occupant 162, for example, may be attached to the occupant's body or clothing or may be held by the occupant. The mobile device 160 may be characterized by a unique identifier (e.g., a serial number or address stored in memory) that uniquely identifies the mobile device 160 and thus the occupant 162. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 160 may be configured to transmit digital messages to the system controller 110, for example, in one or more Internet Protocol packets. For example, the mobile device 160 may be configured to transmit digital messages to the system controller 110 over the LAN and/or via the internet. The mobile device 160 may be configured to transmit digital messages over the internet to an external service (e.g., If This Then That (IFTTT®) service), and then the digital messages may be received by the system controller 110. The mobile device 160 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 160 may be configured to transmit RF signals 108 according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference. Mobile and/or network devices may also communicate with system 100 in other manners.

The operation of the load control system 100 may be programmed and configured using, for example, the mobile device 160 or other network device (e.g., when the mobile device is a personal computing device). The mobile device 160 may execute a graphical user interface (GUI) configuration software for allowing a user to program how the load control system 100 will operate. For example, the configuration software may run as a PC application or a web based application. The configuration software and/or the system controller 110 (e.g., via instructions from the configuration software) may generate a load control database that defines the operation of the load control system 100. The load control database may be stored at the system controller. For example, the load control database may include information regarding the different control-source and control-target devices making up of the load control system, and the operational settings of these different load control devices of the load control system (e.g., the LED drivers of the lighting fixtures 120-126, and/or the motorized window treatments 130,). The load control database may comprise information regarding associations between control-target devices and control-source devices (e.g., the remote control device 140, the sensor 150, etc.). The load control database may comprise information regarding how the control-target devices respond to inputs received from the control-source devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. patent application Ser. No. 13/830,237, filed Mar. 14, 2013, entitled COMMISSIONING LOAD CONTROL SYSTEMS, the entire disclosure of which is hereby incorporated by reference.

Various fixture capability information may be determined as described herein for one or more of the lighting fixtures (e.g., the fixtures 120-126) within load control system 100. The fixture capability information may include one or more fixture capability metrics for one or more operating parameters of the lighting fixtures. For example, one operating parameter of a lighting fixture may be color temperature (e.g., measured in Kelvin), and fixture capability metrics of the color temperature may be a minimum color temperature, a maximum color temperature, a color temperature range, and/or a correlated color temperature (CCT) tuning curve. Another operating parameter of a lighting fixture may be color, and fixture capability metrics of the color may be a color gamut (e.g., represented by the chromaticity coordinates of the individual light sources in the lighting fixture) and/or a color mixing curve. Another fixture capability metric of the color of a lighting fixture may be a spectral power distribution (e.g., a full or partial spectrum) per internal LED light source, which may be represented by one or more peak wavelengths, a spectral width, and/or spectral power measurements at one or more wavelengths. Another operating parameter of a lighting fixture may be intensity, and fixture capability metrics of the intensity of the lighting fixture may be the maximum and minimum lumen outputs per internal LED light source, a dimming range, and/or a dimming curve. Another operating parameter of a lighting fixture may be power consumption, and fixture capability metrics of power consumption may be a power range and/or a power consumption of the lighting fixture when each of the internal LED light sources is turned on individually.

Knowledge of the fixture capability information for the lighting fixtures 120-126 may enable the system controller 110 to control the fixtures to achieve a desired overall effect in the space (e.g., a desired color temperature). For example, a perceived color temperature may differ from a measured color temperature (e.g., measured by a light meter). The system controller may use the fixture capability information for each fixture in a given space (e.g., such as the room 102) to control the fixtures to achieve the perceived color temperature.

The system controller 110 may be configured to obtain the fixture capability information (e.g., information regarding the capabilities of the lighting fixtures that are controlled by the system controller). The lighting fixtures 120-126 may obtain and store the fixture capability information for themselves and/or may share the information with other control devices, such as the system controller based on the system controller communicating with the fixtures to obtain the information, for example. For example, each lighting fixture 120-126 may include a control circuit and a memory for storing its fixture capability information itself. The control circuit of each lighting fixture 120-126 and/or the system controller 110 may retrieve the fixture capability information from the memory in the respective fixture. Additionally or alternatively, the fixture capability information may also be stored in a remote network device (e.g., a server in the cloud). The lighting fixtures 120-126 and/or the system controller 110 may download the fixture capability information from the remote network device.

The fixture capability information of each lighting fixture 120-126 may be determined during manufacturing of the lighting fixtures, for example, at an original equipment manufacturer (OEM). For example, the manufacturer may use a measurement tool to determine the fixture capability information after one or more of the lighting fixtures 120-126 are assembled. The fixture capability information may also be determined (e.g., measured) during commissioning of the load control system 100. For example, a measurement tool (e.g., a mobile measurement device 164) may be located in the space (e.g., placed on a task surface) and may be used to collect the fixture capability information. In addition, a measurement tool (e.g., a measurement sensor 166) may be installed on or near one or more of the lighting fixtures 120-126 for collecting the fixture capability information during commissioning of the load control system 100. The measurement sensor 166 may be removed after the fixture capability information is collected, and/or the measurement sensor 166 may be permanently installed on the lighting fixture (e.g., to operate as a fixture sensor) during normal operation. While not shown in FIG. 1, a separate measurement sensor 166 may be installed on each of the lighting fixtures 120-126.

The system controller 110 may use the obtained fixture capability information to control and/or configure the lighting fixtures 120-126. The system controller 110 may be configured to establish room capability information for the room 102 based on the fixture capability information of the lighting fixtures 120-126 in the room 102. The room capability information may be stored in memory in the system controller 110. The system controller 110 may determine the commands to transmit to the lighting fixtures 120-126 based on the room capability information stored in memory on the system controller. For example, the system controller 110 may receive a command for controlling one or more of the lighting fixtures 120-126 and may determine a command to transmit to the lighting fixtures 120-126 based on the room capability information. For example, the system controller 110 may determine a room color temperature range (i.e., room capability information) based on the color temperature range (i.e., fixture capability information) of all of the lighting fixtures in the room, and may limit all of the fixtures in the room to the room color temperature range. The system controller 110 may establish (e.g., determine) a room color gamut (i.e., room capability information) based on the color gamuts (i.e., fixture capability information) of all of the lighting fixtures in the room, and use the room color gamut to control the lighting fixtures in the room. Additionally or alternatively, the system controller 110 may transmit the room capability information to the lighting fixtures 120-126, which may store the room capability information and may use the room capability information to control the light sources in response to received commands.

The lighting fixtures 120-126 may be configurable, and the system controller 110 may be configured to transmit the room capability information to the lighting fixtures 120-126 for use during normal operation. For example, the lighting fixtures 120-126 may limit their color temperature ranges and/or gamuts based on the room capability information (e.g., the room color temperature range and/or the room color gamut) received from the system controller 110. The system controller 110 may determine a room color mixing curve (i.e., room capability information) and transmit the room color mixing curve to the lighting fixtures 120-126 so that each lighting fixture may emit light at a specific color in response to a requested color temperature to achieve a desired color effect for the room 102. For example, the system controller 100 may control each lighting fixture to emit light at approximately the same color temperature.

The lighting fixtures 120-126 may be configured to limit the power consumption of each lighting fixture to a maximum power threshold across the color temperature range of each lighting fixture (e.g., the room color temperature range). For example, the system controller 110 may identify a constant light intensity to which the light emitted by the lighting fixtures 120-126 may be controlled to prevent the power consumption of each of the lighting fixtures from exceeding the maximum power threshold across the room color temperature range. The system controller 110 may transmit the identified constant light intensity to the lighting fixtures 120-126 for use during normal operation. In addition, the system controller may be configured to determine a color mixing curve for the lighting fixtures 120-126 that maximizes the lighting intensity (e.g., the lumen output) of the lighting fixtures across the room color temperature range without exceeding the maximum power threshold.

Some lighting fixtures in the room 102 may not be configurable. Such unconfigurable lighting fixtures may not be able to receive the fixture and/or room capability information from the system controller 110, to store the fixture and/or room capability information, and adjust their operation in response to the fixture and/or room capability information. For example, some unconfigurable lighting fixtures may only be able to emit light at a static (e.g., fixed) color temperature and/or control the color temperature according to a fixed (e.g., unconfigurable) color mixing curve. Such lighting fixtures may be considered low-performing lighting fixtures since those lighting fixtures may not be able to achieve a desired color temperature range and/or color gamut in the room 102. When configurable and unconfigurable lighting fixtures are located in the same room, it may be desirable to match the operation of the configurable lighting fixtures to the operation of the unconfigurable lighting fixtures so that the color of the light emitted by the lighting fixtures in the room 102 appear to be the same to the human eye even though the color temperature may not be in a desired or preferred color temperature range. For example, if the room includes a lighting fixture with a static color temperature, the system controller 110 may be configured to set the room color mixing curve as constant (e.g., with respect to the requested intensity and/or color temperature) at the static color temperature. In addition, if the room includes a lighting fixture with a fixed color mixing curve, the system controller 110 may be configured to set the room color mixing curve to be the same as the fixed color mixing curve. If the room does not include any unconfigurable lighting fixtures, the system controller 110 may set the room color mixing curve to a desired color mixing curve.

During normal operation, the system controller 110 may be configured to dynamically update the room capability information. For example, the system controller 110 may be configured to adjust the room capability information based on the lighting fixtures that are presently on. The system controller 110 may be configured to obtain the states of one or more of the lighting fixtures based on information received from the measurement sensor(s) 166 (e.g., sensor data). In addition, system controller 110 may be configured to turn off low-performing lighting fixtures to improve the room capabilities. If any of the room capability metrics of the present room capability information fall outside a desired range, the system controller 110 may be configured to turn off the low-performing lighting fixtures in the room. For example, the system controller 110 may be configured to turn off lighting fixtures that have fixture capability metrics that cause the room capability metrics to fall outside the desired range (e.g., low-performing lighting fixtures).

Prior to turning off the low-performing lighting fixtures, the system controller 110 may transmit a message to the mobile device 160 to cause the mobile device to prompt a user as to whether the low-performing lighting fixtures should be turned off or not. For example, the mobile device may display a present (e.g., limited) color temperature range as well as a possible color temperature range (e.g., if the low-performing lighting fixtures are turned off) for the user on the visible display of the mobile device to assist the user in making a decision.

The capabilities of the lighting fixtures 120-126 may fluctuate throughout the operating life of the lighting fixtures depending on various factors. The factors may include the ratings of the lighting fixture, the total time that the lighting fixture has been on, the intensities at which the lighting fixture operates when the lighting fixture is on, the colors and/or color temperatures at which the lighting fixture operates, the mode (e.g., color rendering mode or otherwise) in which the lighting fixture operates, the frequency of events that may occur (e.g., that may have occurred or about to occur based on historical operating data) to the lighting fixture that positively or negatively impacts the fixture's operating life, and/or other factors.

As described herein, the system controller 110 may adjust the room capability information over the lifetimes of the lighting fixtures 120-126 in the room based on updated fixture capability information. The system controller 110 may determine the updated fixture capability information from sensor data received from the measurement sensor 166 and/or information obtained from the fixtures themselves. In addition, the measurement sensor 166 (as well as other measurement sensors in the room 102) may determine the updated fixture capability information and transmit the updated fixture capability information to the system controller 110. The system controller 110 and/or the measurement sensor(s) 166 may record and/or store events and/or the factors that may be related to the operating lifetimes of the lighting fixtures 120-126. In addition, the system controller 110 may receive the recorded events and/or the factors that may be related to the operating lifetimes of the lighting fixtures 120-126 in messages received from the lighting fixtures. The system controller 110 may update the room capability information if any fixture capability metrics of the fixture capability information change by a predetermined amount.

The system controller 110 may generate a warning if one or more of the lighting fixtures exceeds an expected lifetime of the lighting fixture. If a lighting fixture needs to be replaced, a replacement fixture with similar lifetime output may be used to replace the presently-installed lighting fixture. The system controller 110 may program the replacement fixture similarly to the lighting fixture that is replaced (e.g., with the fixture capability information and/or the room capability information of the previously-installed lighting fixture). The system controller 110 may receive a request from a user of the fixture to turn on/off or dial up/down an output of a fixture. The system controller 110 may maintain a relatively consistent lifetime output for each fixture based on a time of a day, a time of a year, occupancy conditions, scene data, and/or others.

Figure 2A:
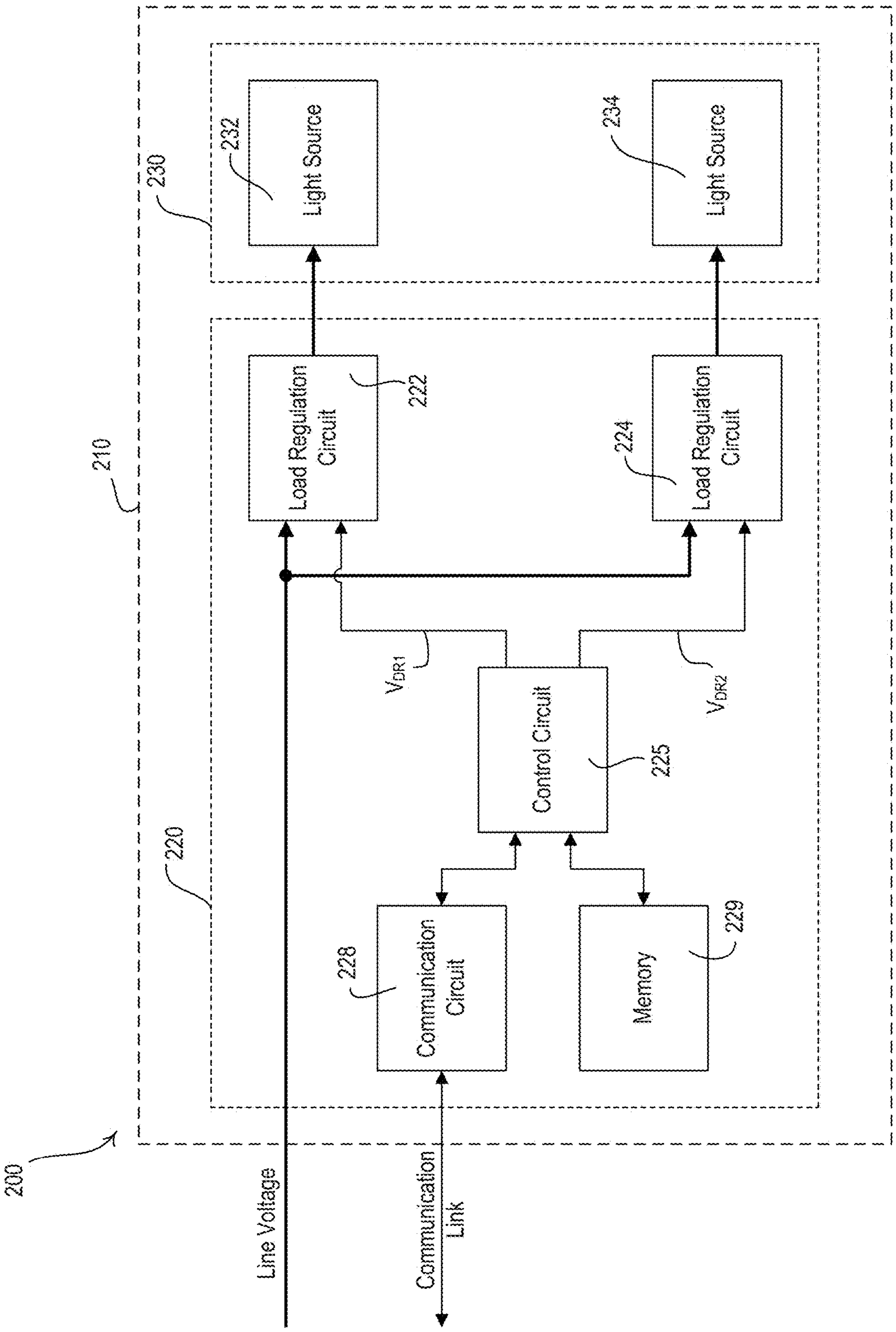
FIG. 2A illustrates an example of a diagram of a lighting fixture including multiple LED drivers (e.g., two LED drivers).

FIG. 2A is a block diagram of an example lighting fixture 200 (e.g., one of the lighting fixtures 120-126 shown in FIG. 1) that may include a controllable-color-temperature load control system 210. The controllable-color-temperature load control system 210 of the lighting fixture 200 may include a multi-channel driver 220 and a composite lighting load 230. The composite lighting load 230 may include a plurality of light sources (e.g., LED light sources). The controllable-color-temperature load control system 210 may be configured to control one or more of the individual elements of the composite lighting load 230 in order to affect the color temperature of the light emitted by the composite lighting load and thus the lighting fixture 200. For example, the composite lighting load 230 may include a first light source 232 and a second light source 234. The first and second light sources 232, 234 may be discrete-spectrum light sources, continuous-spectrum light sources, and/or hybrid light sources. The controllable-color-temperature load control system 210 may be configured to control the first and second light sources 232, 234 in order to achieve a desired intensity and/or color temperature of the light emitted by the composite lighting load 230.

In order to control the color temperature of the light emitted by the composite lighting load 230, the multi-channel LED driver 220 of the controllable-color-temperature load control system 210 may include a first load regulation circuit 222, a second load regulation circuit 224, and a control circuit 225. The control circuit 225 may be configured to generate a first drive signal $V_{DR1}$ to control the first load regulation circuit 222 in order to adjust the intensity of the first light source 232. The control circuit 225 may be configured to generate a second drive signal $V_{DR2}$ to control the second load regulation circuit 224 in order to adjust the intensity of the second light source 234. The drive signals $V_{DR1}$, $V_{DR2}$ may be analog signals and/or digital signals. The control circuit 225 may be coupled to a memory 229 for storing the fixture capability information and/or room capability information of the lighting fixture 200. In addition, the memory 229 may store instructions that are executed by the control circuit 225 to provide the functions described herein.

The control circuit 225 may be configured to control (e.g., individually control) the amount of power delivered to the first and second light sources 232, 234 to thus control the intensities of the light sources. The control circuit 225 may be configured to control the first load regulation circuit 222 to conduct a first load current through the first light source 232, and to control the second load regulation circuit 224 to conduct a second LED current through the second light source 234. For example, the light sources 232, 234 may be different color LED light sources and the light emitted by the light sources may be mixed together to adjust the color temperature of the cumulative light emitted by the lighting fixture 200. For example, the first light source 232 may be a cool-white LED light source and the second light source 234 may be a warm-white LED light source. The control circuit 225 may be configured to adjust the intensities of the cool-white light emitted by the first light source 232 and the warm-white light emitted by the second light source 234 to control the color temperature of the cumulative light emitted by the lighting fixture 200.

The color temperature of the cumulative light emitted by the lighting fixture 200 may range between the cool-white light of the first light source 232 (when only the first light source is on) to the warm-white light of the second light source 234 (when only the second light source is on). The control circuit 225 may be configured to adjust the color temperature between the cool-white light of the first light source 232 and the warm-white light of the second light source 234 by turning both light sources on. The control circuit 225 may control the magnitudes of the load currents conducted through the first and second light sources 232, 234 to mix the cool-white light emitted by the first light source 232 and the warm-white light emitted by the second light source 234, respectively, to control the color temperature of the cumulative light emitted by the lighting fixture 200 to the desired color temperature.

The multi-channel driver 220 may comprise a communication circuit 228 adapted to be coupled to a communication link (e.g., a digital communication link), such that the control circuit 225 may be able to transmit and/or receive messages (e.g., digital messages) via the communication link. The multi-channel driver 220 may be assigned a unique identifier (e.g., a link address) for communication on the communication link. The multi-channel driver 220 may be configured to communicate with a system controller (e.g., the system controller 110), as well as other LED drivers and control devices, via the communication link. The control circuit 225 may be configured to receive messages including commands to control the composite lighting load 230 via the communication circuit 228. For example, the communication link may comprise a wired communication link, for example, a digital communication link operating in accordance with one or more predefined communication protocols (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, or a LUTRON ECOSYSTEM communication link. Additionally or alternatively, the digital communication link may comprise a wireless communication link, for example, a radio-frequency (RF), infrared (IR), or optical communication link. Messages may be transmitted on an RF communication link using, for example, one or more of a plurality protocols, such as the LUTRON CLEARCONNECT, WIFI, ZIGBEE, Z-WAVE, THREAD, KNX-RF, and ENOCEAN RADIO protocols.

The control circuit 225 may be responsive to messages (e.g., digital messages that include the respective link address of the driver) transmitted by the system controller to the multi-channel driver 220 via the communication link. The control circuit 225 may be configured to control the light sources 232, 234 in response to the messages received via the communication link. The system controller may be configured to transmit messages to the multi-channel driver 220 for turning both light sources 232, 234 on and off (e.g., to turn the lighting fixture 200 on and off). The system controller may also be configured to transmit messages to the multi-channel driver 220 for adjusting at least one of the intensity and the color temperature of the cumulative light emitted by the lighting fixture 200. The multi-channel driver 220 may be configured to transmit messages including feedback information via the digital communication link.

The system controller may be configured to transmit a command (e.g., control instructions) to the multi-channel driver 220 for adjusting the intensity and/or the color temperature of the cumulative light emitted by the lighting fixture 200 (e.g., the light emitted by the first and second light sources 232, 234). For example, the command may include a desired intensity (e.g., a requested intensity) and/or a desired color temperature (e.g., a requested color temperature) for the cumulative light emitted by the lighting fixture 200. The control circuit 225 may adjust the magnitudes of the load currents conducted through the first and second light sources 232, 234 to control the cumulative light emitted by the lighting fixture 200 to the desired color temperature of the command. In an example, the intensity levels of both the first and second light sources 232, 234 may be controlled in order to affect the overall color temperature of the light emitted by the composite lighting load 230.

The command transmitted by the system controller may include only an intensity (e.g., and not color temperature), and the control circuit 225 may adjust the magnitudes of the load currents conducted through the first and second light sources 232, 234 to control the cumulative light emitted by the lighting fixture 206 in response to the intensity of the command, for example, to cause the cumulative light emitted by the lighting fixture 200 to become redder as the intensity is decreased (e.g., dimmed). For example, the control circuit 225 may receive an intensity command and, in response to the intensity command, control the magnitude of the load currents conducted through the first and second light sources 232, 234 to not only achieve the desired intensity, but also to achieve the associated color temperature of a black body radiator illuminated at the desired intensity (e.g., according to Plank's law). The intensity of the cumulative light emitted by the lighting fixture 200 may range between a high-end intensity $L_{HE}$ (e.g., a maximum intensity, such as 100%) and a low-end intensity $L_{LE}$ (e.g., a minimum intensity, such as 0.1-10%). In such an example, the control circuit 225 may be configured to control the second load regulation circuit 224 such that the second light source 234 is maintained at a relatively constant intensity level.

Figure 2B:
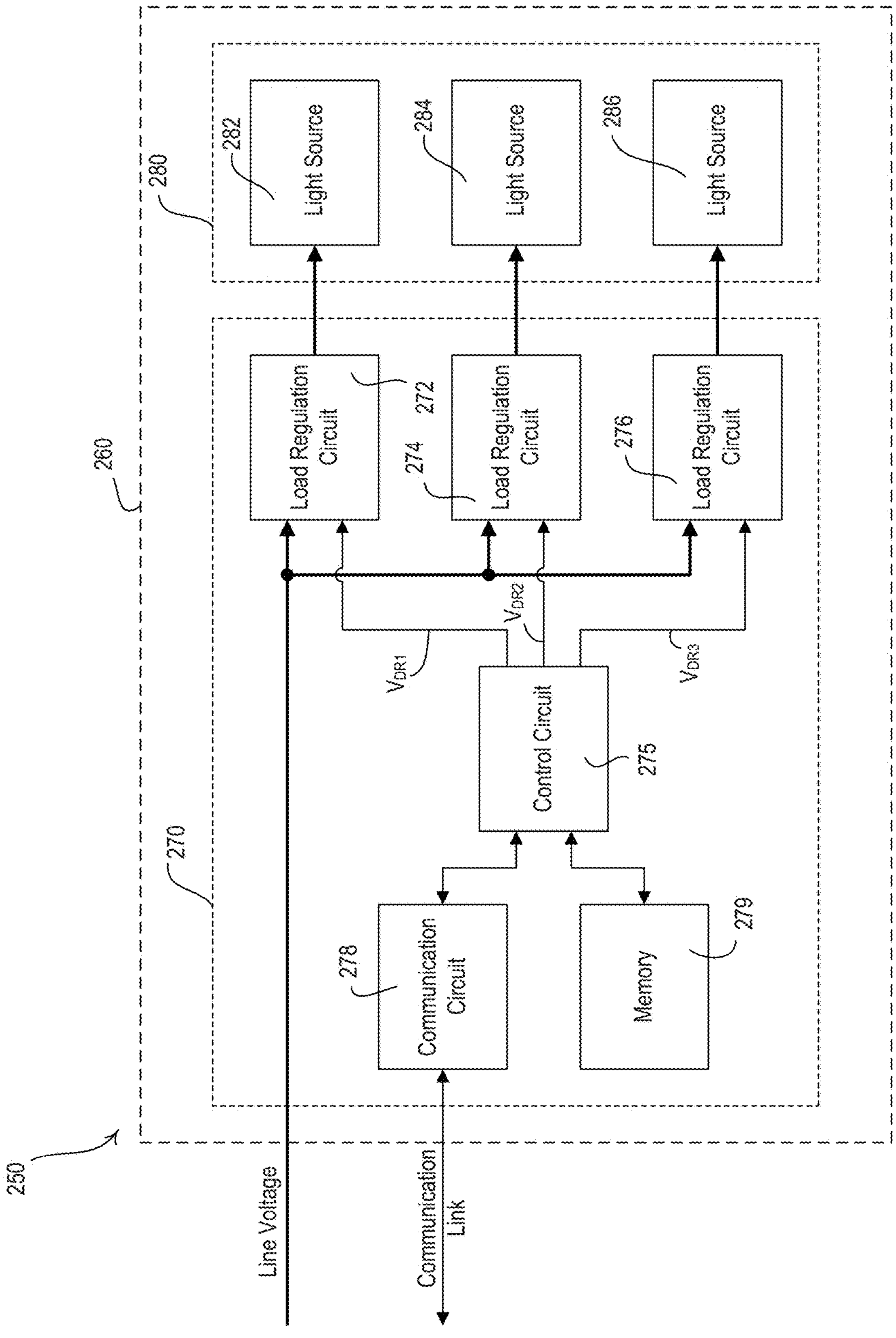
FIG. 2B illustrates an example of a diagram of a fixture including multiple LED drivers (e.g., three LED drivers).

FIG. 2B is a block diagram of another example lighting fixture 250 (e.g., one of the lighting fixtures 120-126 shown in FIG. 1) that may include a controllable-color-temperature load control system 260. The controllable-color-temperature load control system 260 of the lighting fixture 250 may include a multi-channel driver 270 and a composite lighting load 280. For example, the composite lighting load 280 may include a first light source 282, a second light source 284, and a third light source 286. The light sources 282-286 may be discrete-spectrum light sources, continuous-spectrum light sources, and/or hybrid light sources. The controllable-color-temperature load control system 260 may be configured to control light sources 282-286 in order to achieve a desired intensity and/or color temperature of the light emitted by the composite lighting load 280.

In order to control the color temperature of the light emitted by the composite lighting load 280, the multi-channel driver 270 of the controllable-color-temperature load control system 260 may include a first load regulation circuit 272, a second load regulation circuit 274, a third load regulation circuit 276, and a control circuit 275. The control circuit 275 may be configured to generate a first, second, and third drive signals $V_{DR1}$, $V_{DR2}$, $V_{DR3}$ to control each of the respective load regulation circuits 272, 274, 276 in order to adjust the intensity of the respective light source 282, 284, 286. The control signals may be analog signals and/or digital signals. In an example, the control circuit 275 may be configured to control the intensities of the light sources 282, 284, 286 in order to adjust the overall color temperature of the light emitted by the composite lighting load 280. The control circuit 275 may be coupled to a memory 279 for storing the fixture capability information and/or room capability information of the lighting fixture 250. In addition, the memory 279 may store instructions that are executed by the control circuit 275 to provide the functions described herein.

The control circuit 275 may be configured to control (e.g., individually control) the amount of power delivered to the first, second, and third light sources 282, 284, 286 to thus control the intensities of the light sources. The control circuit 275 may be configured to control the first, second, and third load regulation circuits 272, 274, 276 to conduct a respective load currents through the respective light sources 282, 284, 286. For example, the light sources 282, 284, 286 may be different color LED light sources and the light emitted by the light sources may be mixed together to adjust the color temperature of the cumulative light emitted by the lighting fixture 250. The control circuit 275 may be configured to adjust the intensities of the light sources 282, 284, 286 to control the color of the cumulative light emitted by the lighting fixture 250 within a color gamut of the lighting fixture. For example, the control circuit 275 may be configured to mix the light emitted by the light sources 282, 284, 286 to adjust the color temperature of the light emitted by the composite lighting load 280 along a black body radiator curve.

The multi-channel driver 270 may comprise a communication circuit 278 adapted to be coupled to a communication link (e.g., a digital communication link), such that the control circuit 275 may be able to transmit and/or receive messages (e.g., digital messages) via the communication link. The multi-channel driver 270 may be assigned a unique identifier (e.g., a link address) for communication on the communication link. The multi-channel driver 220 may be configured to communicate with a system controller (e.g., the system controller 110), as well as other drivers and control devices, via the communication link. The control circuit 275 may be configured to receive messages including commands to control the composite lighting load 280 via the communication circuit 278. For example, the communication link may comprise a wired communication link, for example, a digital communication link operating in accordance with one or more predefined communication protocols (such as, for example, one of Ethernet, IP, XML, Web Services, QS, DMX, BACnet, Modbus, LonWorks, and KNX protocols), a serial digital communication link, an RS-485 communication link, an RS-232 communication link, a digital addressable lighting interface (DALI) communication link, or a LUTRON ECOSYSTEM communication link. Additionally or alternatively, the digital communication link may comprise a wireless communication link, for example, a radio-frequency (RF), infrared (IR), or optical communication link. Messages may be transmitted on an RF communication link using, for example, one or more of a plurality protocols, such as the LUTRON CLEARCONNECT, WIFI, ZIGBEE, Z-WAVE, THREAD, KNX-RF, and ENOCEAN RADIO protocols.

The control circuit 275 may be responsive to messages (e.g., digital messages that include the respective link address of the driver) transmitted by the system controller to the multi-channel driver 270 via the communication link. The control circuit 275 may be configured to control the light sources 282, 284, 286 in response to the messages received via the communication link. The system controller may be configured to transmit messages to the multi-channel driver 270 for turning light sources 282, 284, 286 both on and off (e.g., to turn the lighting fixture 250 on and off). The system controller may also be configured to transmit a command to the multi-channel driver 270 for adjusting at least one of the intensity and the color (e.g., the color temperature) of the cumulative light emitted by the lighting fixture 250. For example, the command may include a desired intensity (e.g., a requested intensity) and/or a desired color temperature (e.g., a requested color temperature) for the cumulative light emitted by the lighting fixture 250. The control circuit 275 may adjust the magnitudes of the load currents conducted through the first, second, and third light sources 282, 284, 286 to control the cumulative light emitted by the lighting fixture 250 to the desired color temperature of the command. The multi-channel driver 270 may be configured to transmit messages including feedback information via the digital communication link.

During normal operation, the control circuit 275 may be configured to maintain a relatively consistent runtime for each light source 282, 284, 286 in the lighting fixture 250. For example, if the first light source 282 has been illuminated to a greater intensity during a daytime period (e.g., an occupied time period) than second and third light sources, the control circuit 275 may be configured to turn off or decrease the intensity of the first light source 282, and turn on or increase the intensities of the second and third light source 284 during a nighttime period (e.g., an unoccupied time period). The control circuit 275 may be configured to operate the first, second, and third light sources 282, 284, 286 at approximately the same runtime.

For example, the parts of the controllable-color-temperature load control systems 210, 260 may be located in different devices. For example, the multi-channel driver 220 of the controllable-color-temperature load control system 210 may be located external to the lighting fixture 200 in which the composite lighting load 230 is mounted. Additionally, the elements of each of the controllable-color-temperature load control systems 210, 260 may be included in the same device (e.g., mounted in one of the lighting fixtures 120-126).

Further, the controllable-color-temperature load control systems 210, 260 may each be implemented in a single device or multiple devices. For example, the control circuit 225 of the multi-channel driver 220 may be comprised of two (or more) individual control circuits for controlling the individual light sources of the composite lighting load 230. The individual control circuits may be in operative communication with each other and may be located in the same or different devices. For example, the individual control circuits may each be configured to control an individual load regulation circuits (e.g., one of the load regulation circuits 222, 224). Examples of lighting fixtures having a multi-channel driver for load control systems are described in greater detail in U.S. Patent Application Publication No. 2016/0183344, published Jun. 23, 2016, entitled MULTI-CHANNEL LIGHTING FIXTURE HAVING MULTIPLE LIGHT-EMITTING DIODE DRIVERS. One will recognize that other example multi-channel drivers may be used with the systems described herein. In addition, one will recognize that multi-channel drivers may include additional light sources (i.e., more than two or three as described herein).

Figure 3:
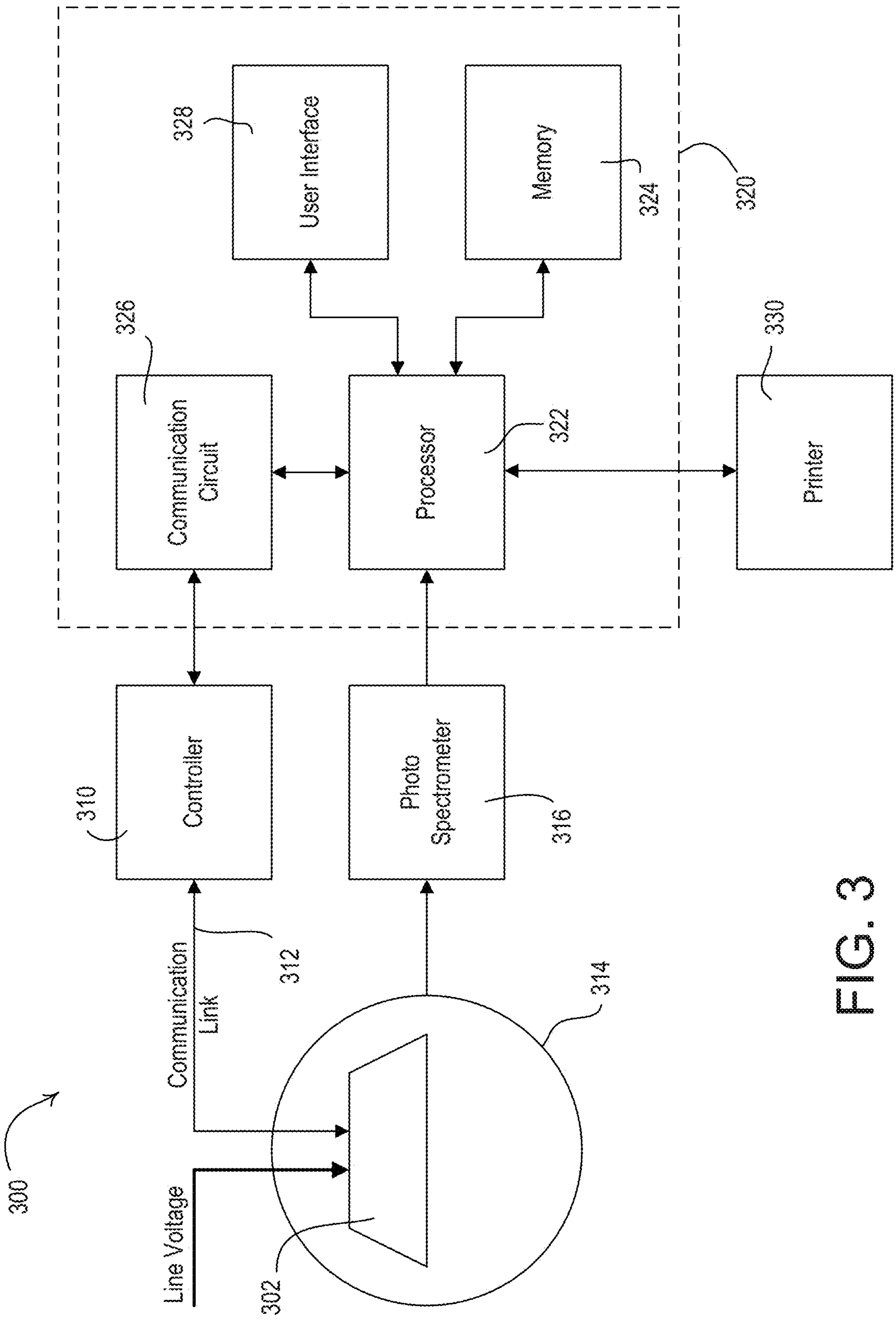
FIG. 3 is a simplified block diagram of an example measurement tool for use by a manufacturer to determine the capabilities of a lighting fixture.

As previously mentioned, the capabilities of a lighting fixture may be determined during manufacturing of the lighting fixture (e.g., at an OEM using a measurement tool). FIG. 3 is a simplified block diagram of an example measurement tool 300 for use by a manufacturer to determine the capabilities of a lighting fixture 302 (e.g., one of the lighting fixtures 120-126 of FIG. 1 and/or one of the lighting fixtures 200, 250 shown in FIGS. 2A and 2B). The lighting fixture 302 may include one or more drivers (e.g., a multi-channel LED driver) and one or more light sources (e.g., LED light engines). The lighting fixture 302 may be powered from line voltage, and may be coupled to a controller 310 (e.g., the system controller 110) via a communication link 312. The communication link 312 may be a wired or wireless communication link. The controller 310 may be configured to transmit commands for adjusting the intensity and/or the color (e.g., the color temperature) of the light emitted by the lighting fixture 302 via the communication link 312. Specifically, the controller 310 may be configured to transmit commands for adjusting the intensities of the individual light sources of the lighting fixture 302 (e.g., the different colored LEDs).

The measurement tool 300 may comprise a light collection unit, such as an integrating sphere 314, in which the lighting fixture 302 may be located to collect (e.g., determine) the fixture capability information of the lighting fixture 302. The measurement tool 300 may further comprise a light measurement meter, such as a photo spectrometer 316, which is coupled to the integrating sphere 314 for receiving and analyzing the light emitted by the lighting fixture 302. For example, the photo spectrometer 316 may be configured to measure an operating characteristic of the light emitted by the lighting fixture 302 (e.g., an intensity, a color, a color temperature, a spectrum, etc.). The photo spectrometer 316 may be coupled to a processing device 320 (e.g., a personal computer or a laptop). The processing device 320 may comprise a processor 322 for processing the information about the light emitted by the lighting fixture 302 from the photo spectrometer 316. The processor 322 may be configured to use the information to determine the fixture capability information of the lighting fixture 302 and store the fixture capability information in a memory 324. In addition, the memory 324 may store instructions that are executed by the processor 322 to provide the functions described herein. The processing device 320 may comprise a user interface 328 for receiving inputs (e.g., via a keyboard and/or a mouse) and for displaying data, such as the fixture capability information of the lighting fixture 302 (e.g., via a visual display). The processing device 320 may also comprise a communication circuit 326 for communicating via a wired or wireless communication link (e.g., an Ethernet communication link).

The processor 322 may be configured to transmit the fixture capability information to the lighting fixture 302 via the communication circuit 326 and the communication link 314 for storage on a memory of the lighting fixture (e.g., the memory 229, 279). The processor 322 may also be configured to transmit the fixture capability information to a remote network device (e.g., a server in the cloud) via the communication circuit 326. The processor 322 may be configured to print a label containing identifying information (e.g., identifiers such as a serial number and/or a barcode). The label may be placed on the lighting fixture 302 or one of the components of the lighting fixture 302 and may be used to retrieve the fixture capability information from the remote network device at a later date (e.g., at the time of installation and/or commissioning of the fixture in a load control system). For example, the processor 322 may be coupled to a printer 330 where the label containing the identifying information is to be printed. Additionally or alternatively, the measurement tool 300 may not include the controller 310, and the processor 322 may be configured to communicate directly with the lighting fixture 302.

Figure 4:
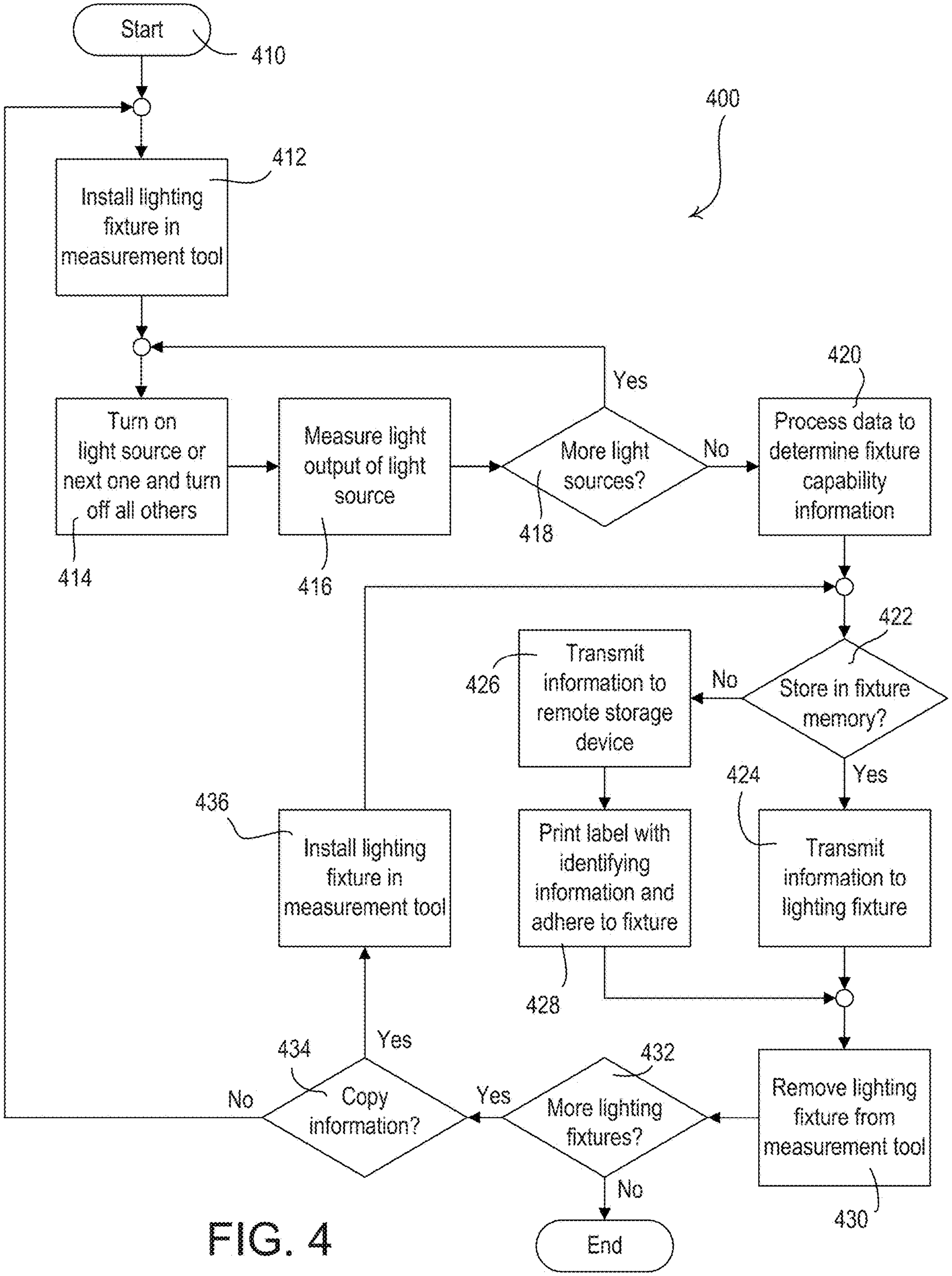
FIG. 4 is a simplified flowchart of a measurement procedure for determining the fixture capability information of a lighting fixture.

FIG. 4 is a simplified flowchart of a measurement procedure 400 for determining the fixture capability information of a lighting fixture (e.g., the lighting fixture 302). The measurement procedure 400 may start at 410. The measurement procedure 400 may be executed using a measurement tool (e.g., the measurement tool 300 shown in FIG. 3), for example, at a manufacturer of the lighting fixture (e.g., an original equipment manufacturer (OEM), or a manufacturer that installs discrete-spectrum light sources in the fixture). For example, during the measurement procedure 400, the processor 322 of the measurement toll 300 may control the controller 310 to set the lighting fixture 302 to a first setting, receive a measurement from the photo spectrometer 316, and store the reading. Once all readings stored, the processor 322 may then determine the fixture capability information. The user may be able to enter (e.g., manually enter) configuration details of the lighting fixture 302 (e.g., using a keyboard of the user interface 328). Alternatively, one or more steps of the measurement procedure 400 may be performed during commissioning of the fixture and/or after commissioning of the lighting fixture (e.g., during periodic recalibration throughout an operational life of the lighting fixture). One or more steps of the measurement procedure 400 may be manually performed by a user of the lighting fixture and/or triggered by an event and automatically performed by a control device.

At 412, the lighting fixture may be installed in the measurement tool (e.g., in the integrating sphere 314 of the measurement tool 300). At 414, one of the light sources of the lighting fixture may be turned on (e.g., to full intensity, such as 100%) and the other light sources may be turned off (e.g., only one light source of the lighting fixture may be turned on). For example, in response to a command from processor 322, the controller 310 of the measurement tool 300 may transmit a message including a command to turn on one light source to the lighting fixture 302 via the communication link 312 at 414 of the measurement procedure 400. At 416, the light output of the lighting fixture may be measured (e.g., the intensity, color, color temperature, spectrum, efficacy, change in efficacy with dimming, etc.). For example, the photo spectrometer 316 of the measurement tool 300 may receive and analyze the light emitted from the light fixture 302 at 416 and communicate the information to the processor 322. In addition, at 416, the power consumption of the lighting fixture may be measured (e.g., measured using a power measurement device (not shown) coupled to the line voltage input of the lighting fixture) and/or the power consumption of the light source that is presently on may be determined (e.g., measured and/or reported by the lighting fixture 302 to the controller 312 and then to processor 322). At 418, it may be determined whether there are more light sources in the lighting fixture. If there are more light sources in the lighting fixture at 418, the measurement procedure 400 may loop around to turn off the present light source and turn on the next light source at 414 and then measure the light output of that next light source at 416.

If there are not more light sources in the lighting fixture at 418, the fixture capability information of the lighting fixtures may be determined at 420 using the measured information. For example, the processor 322 of the measurement tool 300 may process the data collected from the light output of some (e.g., all) of the light sources of the lighting fixture 302 to determine the fixture capability information of the lighting fixture 302. The fixture capability information may include one or more fixture capability metrics for one or more operating parameters of the lighting fixtures, such as a dimming range, a color temperature range, a maximum color temperature, a minimum color temperature, a color gamut, a spectral power distribution, a power range, a dimming curve, a color mixing curve, a color temperature curve, maximum and minimum lumen outputs per internal light source, power consumption per internal light source, or other fixture capability metrics. At 420, a fixture type for the lighting fixture may also be determined (e.g., may be manually entered by a user). The fixture type may include information about a number of channels for the LED driver of the lighting fixture, types of the light sources mounted in the lighting fixture (e.g., discrete-spectrum light sources), color type of the discrete light sources mounted in the lighting fixture, and/or the like. Different fixture types may be associated with different fixture capabilities.

At 422, a determination may be made as to whether the fixture capability information should be stored in a memory of the lighting fixture and/or be uploaded to a remote network device (e.g., a server in the cloud) for storage at the remote network device. For example, the driver in the lighting fixture may include a memory. If the fixture capability information should be stored in the memory of the lighting fixture at 422, the fixture capability information (e.g., the fixture capability information that is determined at 420) may be transmitted to the lighting fixture via the controller 310 for storage in the memory of the lighting fixture at 424.

If the fixture capability information should not be stored in the memory of the lighting fixture at 422, the fixture capability information may be transmitted to the remote network device at 426. Some or all of the fixture capability information may be retrieved by the lighting fixture and/or a system controller (e.g., the system controller 110 of the load control system 100) at a later time. For such lighting fixtures (or sets of lighting fixtures), the fixture capability information may be stored in connection with identifying information for the fixture (e.g., an identifier such as a serial number and/or a barcode). At 428, a label having the identifying information (e.g., the serial number and/or the barcode) may be printed and/or may be affixed (e.g., adhered) to the lighting fixture. In addition, the fixture capability information may be transmitted to both the lighting fixture at 424 and the remote network device at 426 for storage at the respective devices. When the fixture capability information is retrieved by the system controller at a later date, the system controller may determine how to determine room capability information based on the fixture capability information obtained for the lighting fixtures (e.g., all lighting fixtures in and/or near a room) and/or use the determined room capability information to control the lighting fixtures.

At 430, the lighting fixture may be removed from the measurement tool. If there are more lighting fixtures for which the fixture capability information should be determined and/or stored at 432, a determination is made, at 434, as to whether the fixture capability information from the lighting fixture that was just determined (e.g., determined as described herein at 420) should be copied to other lighting fixtures. If the fixture capability information should be copied at 434, a second or another lighting fixture may be installed in the measurement tool at 436 and the measurement procedure 400 may loop around to transmit the fixture capability information to the lighting fixture at 424 or to the remote network device at 426. If the fixture capability information should not be copied at 434, the measurement procedure 400 may loop around to determine the fixture capability information of a different (e.g., a second or a third) lighting fixture at 412-420. It may be determined whether there are more lighting fixtures for which the fixture capability information should be determined and/or stored. When there are no more lighting fixtures for which the fixture capability information should be determined and/or stored at 432, the measurement procedure 400 exits.

The fixture capability information may also be determined (e.g., measured) during commissioning of the lighting fixture and/or a load control system for control of the lighting fixture (e.g., the load control system 100). To determine the fixture capability information of a lighting fixture during commissioning, a measurement tool (e.g., a measurement sensor) may be installed on or near the lighting fixture during commissioning of the lighting fixture and/or the load control system. The measurement tool may include a sensing circuit (e.g., a photo spectrometer) for receiving and analyzing the light emitted by the lighting fixture and a communication circuit for communicating the fixture capability information to the system controller, a network device, and/or another device of the load control system. The system controller may be configured to cause the lighting fixture to turn on each internal light sources (e.g., internal light source) individually, for example, as in 414 of the measurement procedure 400. The measurement tool may measure the light output of the lighting fixture (e.g., as in 416 of the measurement procedure 400). After the light output of some individual light sources (e.g., each individual light source) of the lighting fixture is measured, the measurement tool may process the data to determine the fixture capability information (e.g., as in 420 of the measurement procedure 400) and then transmit the fixture capability information to the system controller and/or a network device. The fixture capability information may be recorded. The network device may display the recorded information, and a user may configure the operation of the lighting fixture via the network device. After the system controller and/or the network device has received the fixture capability information, the measurement tool may then be removed from the lighting fixture or the room. Additionally or alternatively, the measurement tool may transmit the data regarding the light outputs of individual light sources (e.g., all of the individual light sources) of the lighting fixture to the system controller and/or network device, and the system controller and/or network device may be configured to process the data to determine the fixture capability information.

Additionally or alternatively, a lighting fixture may include a permanently-installed measurement sensor (e.g., a fixture sensor) that may be configured to determine the fixture capability information of the lighting fixture at commissioning and/or after commissioning (e.g., to monitor and detect changes in the fixture capability information over the life of the lighting fixture). The measurement sensor may include a communication circuit for transmitting and receiving the RF signals using a proprietary protocol and/or a communication circuit for transmitting and receiving the RF signals using a standard protocol. During commissioning of the load control system, the measurement sensor may be configured to measure the light output of the lighting fixture and/or determine the fixture capability information. The measurement sensor may be configured to transmit the fixture capability information to the system controller and/or network device (e.g., directly to the system controller and/or network device via the RF signals 109 using the standard protocol). Additionally or alternatively, the measurement sensor may transmit the data regarding light outputs of all of the individual light sources of the lighting fixture to the system controller and/or network device, and the system controller and/or network device may be configured to process the data to determine the fixture capability information.

Figure 5:
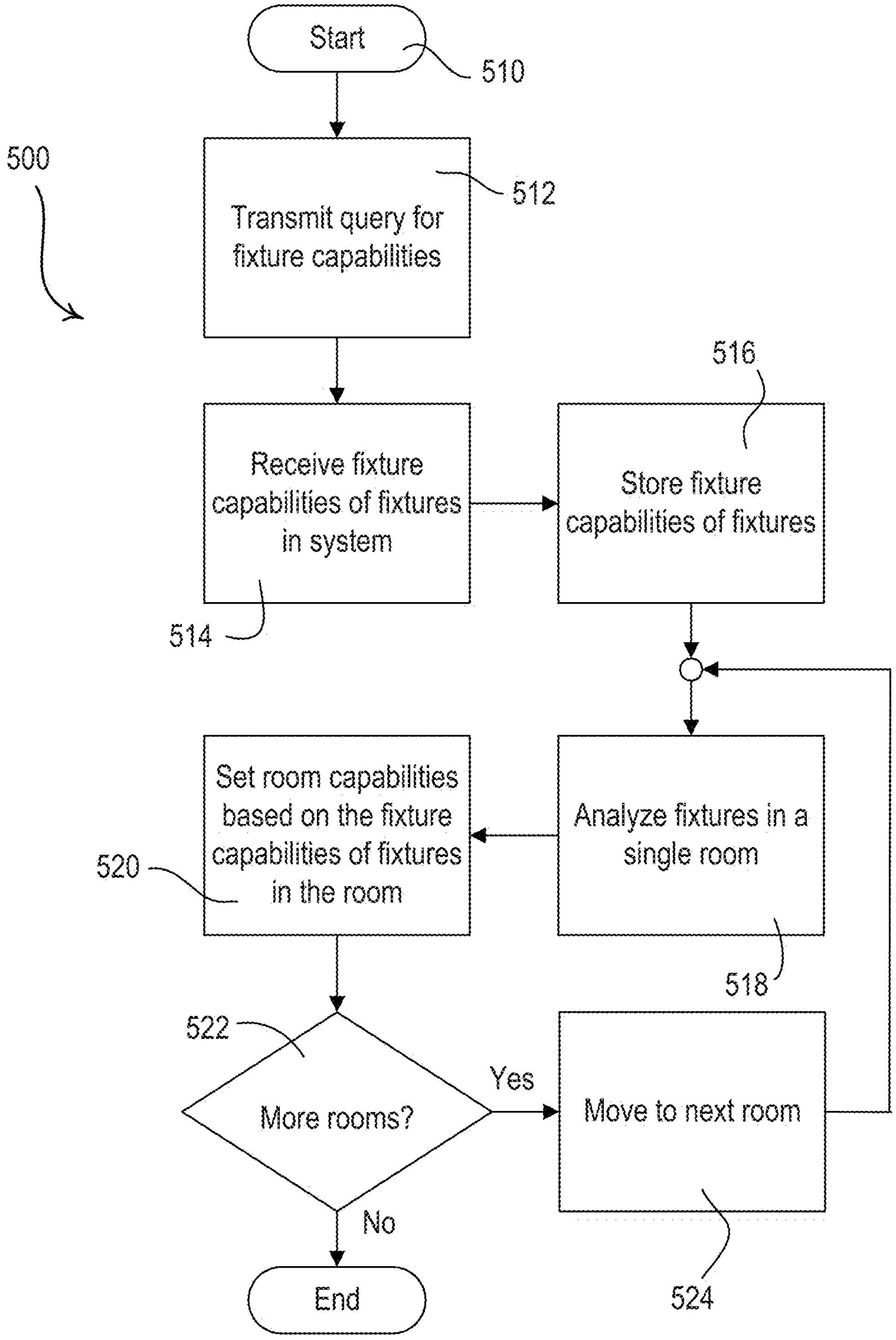
FIG. 5 is a simplified flowchart of a configuration procedure for retrieving fixture capability information of one or more lighting fixtures and configuring the operation of the fixture based on the fixture capability information.

FIG. 5 is a simplified flowchart of a configuration procedure 500 for retrieving fixture capability information of one or more lighting fixtures (e.g., the lighting fixtures 120-126, 200, 250, 302) and configuring the operation of the fixtures based on the fixture capability information. For example, the configuration procedure 500 may be executed by a system controller of a load control system (e.g., the system controller 110 of the load control system 100) during commissioning of the load control system. The system controller may be configured to determine room capability information in response to the fixture capability information of the lighting fixtures in a room (e.g., all of the lighting fixtures in the room) and limit the operation of the lighting fixtures based on the determined room capability information. The system controller may step through a plurality of rooms in a building and determine room capability information for each room based on the lighting fixtures located in the respective room. One or more steps of the configuration procedure 500 may be performed during commissioning of the fixture and/or after commissioning of the fixture (e.g., during periodic recalibration throughout an operational life of the fixture).

The configuration procedure 500 for determining room capability information may start at 510. At 512, the system controller may transmit one or more messages including a query for fixture capability information of the lighting fixtures in a present room. For example, the lighting fixtures may have been previously included in various rooms in a database of the system controller that defines the operation of a load control system. The system controller may be able to retrieve identifiers for the drivers of the lighting fixtures in the present room from the database. If the lighting fixtures have the fixture capability information stored in memory in the drivers of the lighting fixtures, the system controller may transmit the query to the drivers in the lighting fixtures at 512, and the drivers may respond with the fixture capability information. The system controller may also be able to retrieve identifiers for the drivers of the lighting fixtures in the present room from identifying information (e.g., serial numbers and/or barcodes) on the lighting fixtures and/or drivers in the lighting fixtures. If the fixture capability information is stored in a cloud server, the system controller may transmit the query to the cloud server using the identifying information at 512, and the cloud server may respond with the fixture capability information. Additionally or alternatively, a network device (e.g., the network device 160) may be configured to retrieve the identifying information (e.g., by scanning a barcode), transmit the query to the cloud server using the identifying information, and forward the fixture capability information from the cloud server to the system controller.

At 514, the system controller may receive the fixture capability information for the lighting fixtures in the room (e.g., from the lighting fixtures, the cloud server, and/or the network device). Further, the system controller may be configured to obtain the fixture capability information of one or more of the lighting fixtures (e.g., unconfigurable lighting fixtures) from a measurement sensor during commissioning of the load control system. At 516, the system controller may store the fixture capability information of the lighting fixtures in the room in its memory and/or database. The system controller may analyze the fixture capability information of the fixtures in the room at 518 and establish the room capability information for the room based on the analyzed fixture capability information at 520.

It may be determined whether there are more rooms for which the room capability information is to be set. If there are more rooms for which the room capability information needs to be set at 522, the system controller may move to the next room at 524 and the configuration procedure 500 may loop around to analyze the fixture capability information of the lighting fixtures in the next room at 518 and establish the room capability information at 520. When there are no more rooms for which the room capability information is to be set at 522, the configuration procedure 500 may exit.

Figure 6A:
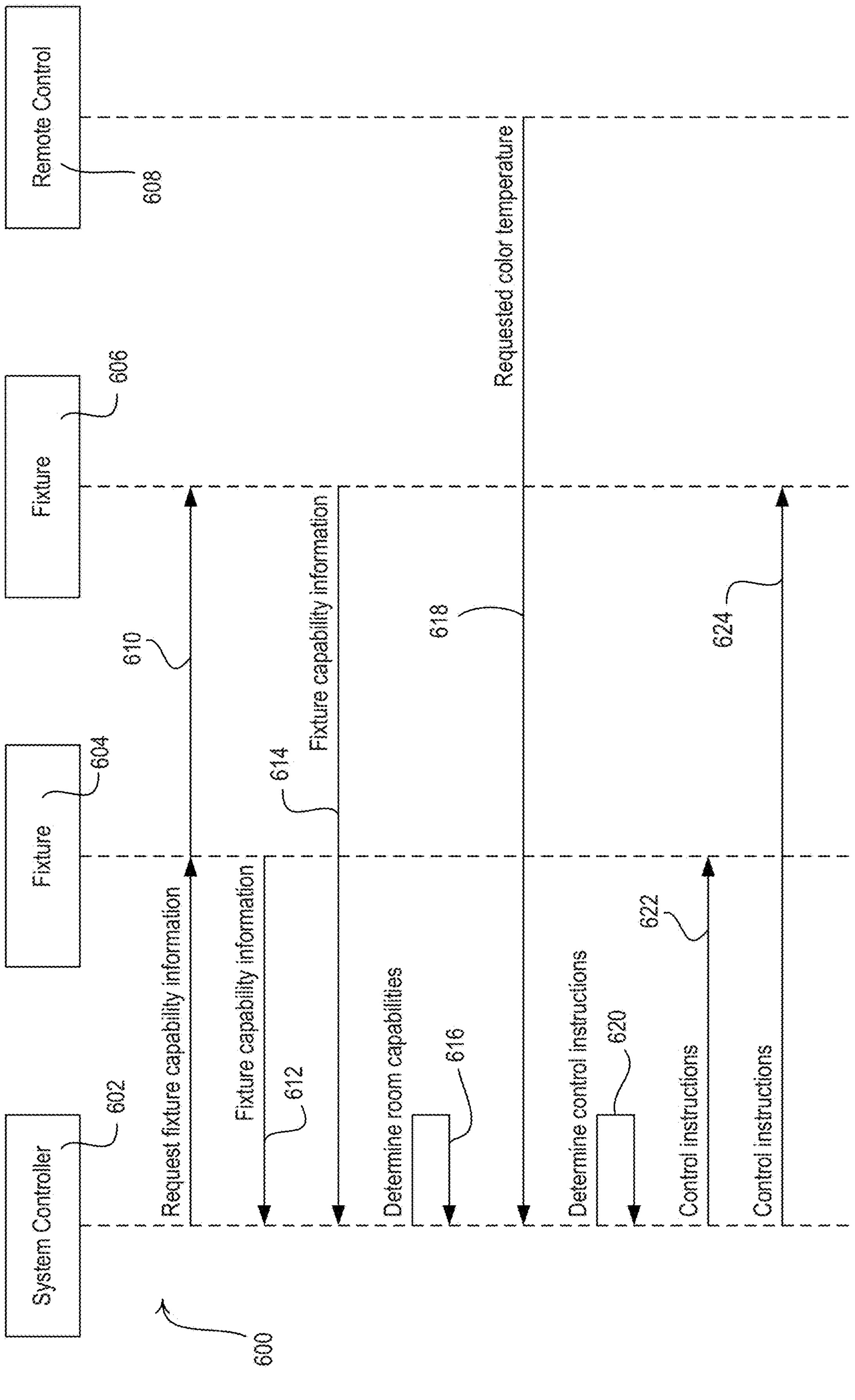
FIG. 6A is an example communication flow showing communications between a system controller and lighting fixtures to retrieve fixture capability information of the lighting fixtures and control the fixtures based on the fixture capability information.

FIG. 6A is an example communication flow 600 showing communications between a system controller 602 (e.g., the system controller 110) and lighting fixtures 604, 606 (e.g., lighting fixtures 120-126, 200, 250, 302) to retrieve fixture capability information from the lighting fixtures and then control the lighting fixtures based on the fixture capability information. Each of the lighting fixtures 604, 606 may include, for example, a multi-channel driver that may have a memory for storing the fixture capability information. At 610, the system controller 602 may transmit (e.g., broadcast) a message (e.g., a query message) to request fixture capability information from the lighting fixtures 604, 606. For example, the message may include identifiers for the lighting fixtures 604, 606 that are located in a single room. One or more of the lighting fixtures 604, 606 may each retrieve fixture capability information from its memory, and send the retrieved fixture capability information to the system controller 602 at 612 and 614. At 616, the system controller 602 may determine room capability information based on the fixture capability information received from the lighting fixtures 604, 606.

The system controller 602 may transmit control instructions to control the lighting fixtures 604, 606 after the system controller receives the fixture capability information from the lighting fixtures. At 618, the system controller 602 may receive a message including, for example, a requested color temperature, from a control device, such as a remote control 608 that may receive a control input from a user (e.g., in response to an actuation of a button). At 620, the system controller 602 may determine and generate control instructions in response to the requested color temperature based on the room capability information. At 622 and 624, the system controller 602 may transmit a message that may include the control instructions to the lighting fixtures 604, 606.

Figure 6B:
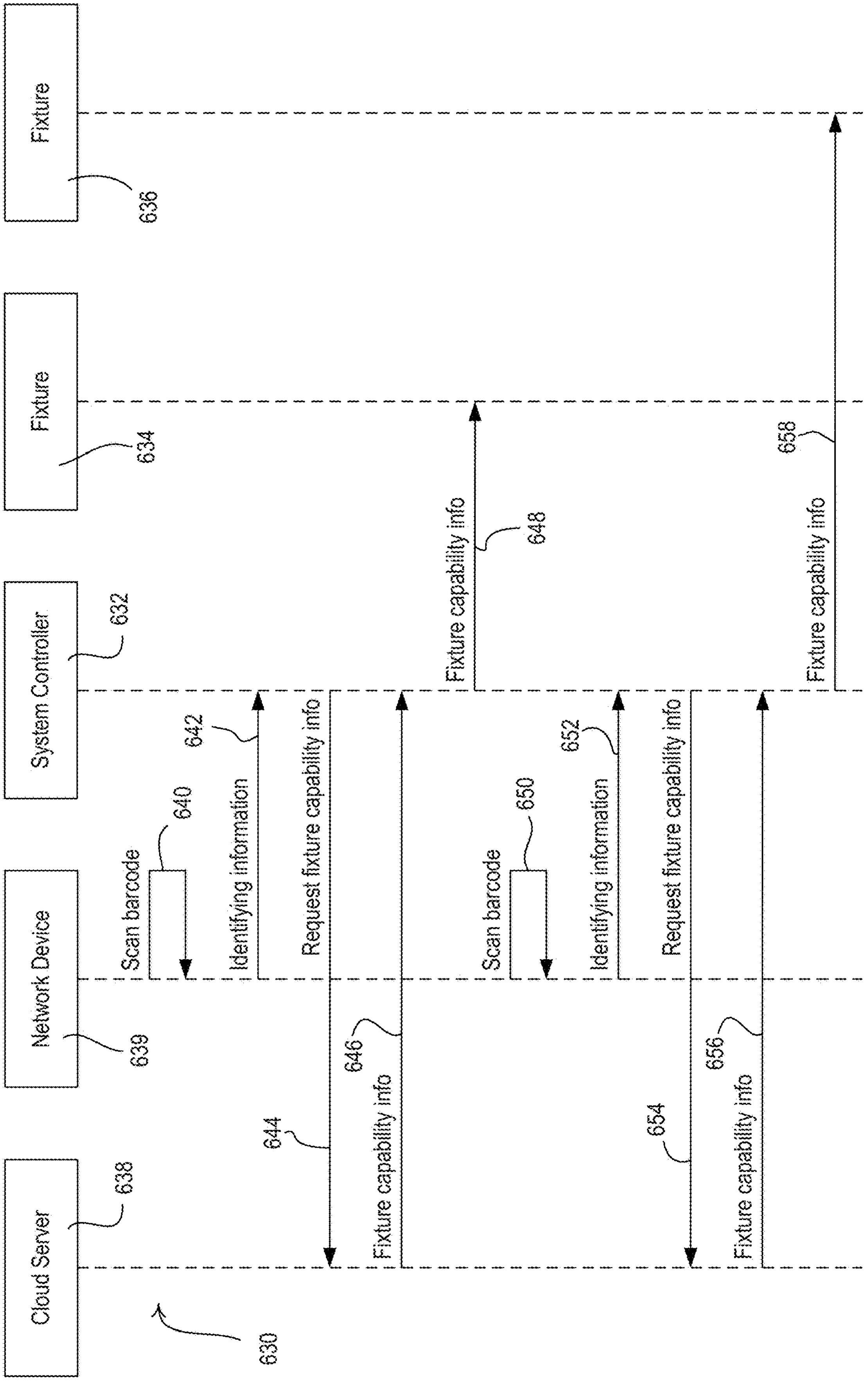
FIG. 6B is an example communication flow showing communications between a system controller and lighting fixtures to retrieve fixture capability information of the lighting fixtures from a cloud server.

FIG. 6B is an example communication flow 630 showing communications between a system controller 632 (e.g., the system controller 110) and lighting fixtures 634, 636 (e.g., lighting fixtures 120-126, 200, 250, 302) to retrieve fixture capability information from a cloud server 638. One or more of the lighting fixtures 634, 636 may include, for example, a multi-channel driver. First, the system controller 632 may obtain identifying information of the lighting fixture for which the fixture capability information is to be retrieved. For example, at 640, a user may scan a barcode on a label on the first lighting fixture 634 using a network device 639 to retrieve an identifier (e.g., a serial number) of the lighting fixture. The network device 639 may transmit the identifier to the system controller 632 at 642. In addition, the system controller 632 may retrieve the identifier from a database that defines the operation of the lighting fixture 634, 636.

At 644, the system controller 632 may send a message (e.g., a query message) to the cloud server 638 to request fixture capability information for the first lighting fixture 634 (e.g., by including the identifier for the first lighting fixture in the query message). At 646, the cloud server 638 may transmit the fixture capability information for the first lighting fixture 634 to the system controller 632. At 648, the system controller 632 may store the information and may also transmit the received fixture capability information to the first lighting fixture 634 (e.g., if the driver in the first lighting fixture 634 has a memory and/or requires the fixture capability information to operate).

The process may then be repeated for the second lighting fixture 636. At 650, a user may scan a barcode on a label on the second lighting fixture 636 using the network device 639 to retrieve an identifier of the second lighting fixture 636. The network device 639 may transmit the identifier to the system controller 632 at 652. The system controller 632 may send a message to the cloud server 638 to request fixture capability information for the second lighting fixture 636 at 654, and the cloud server 638 may transmit the fixture capability information for the second lighting fixture 636 to the system controller 632 at 656. At 658, the system controller 632 may store the information and may also transmit the received fixture capability information to the second lighting fixture 636 (e.g., if the driver in the second lighting fixture 636 has a memory and/or requires the fixture capability information to operate).

After the system controller 632 has received the fixture capability information for the lighting fixtures 634, 636, the system controller 632 may determine room capability information based on the fixture capability information received from the lighting fixtures (e.g., similar to 616 in FIG. 6A). The system controller 632 may then generate and transmit control instructions to control the lighting fixtures 634, 636, for example, in response to receiving a command to adjust the color temperatures of the lighting fixtures (e.g., similar to 618-624 in FIG. 6A).

Figure 6C:
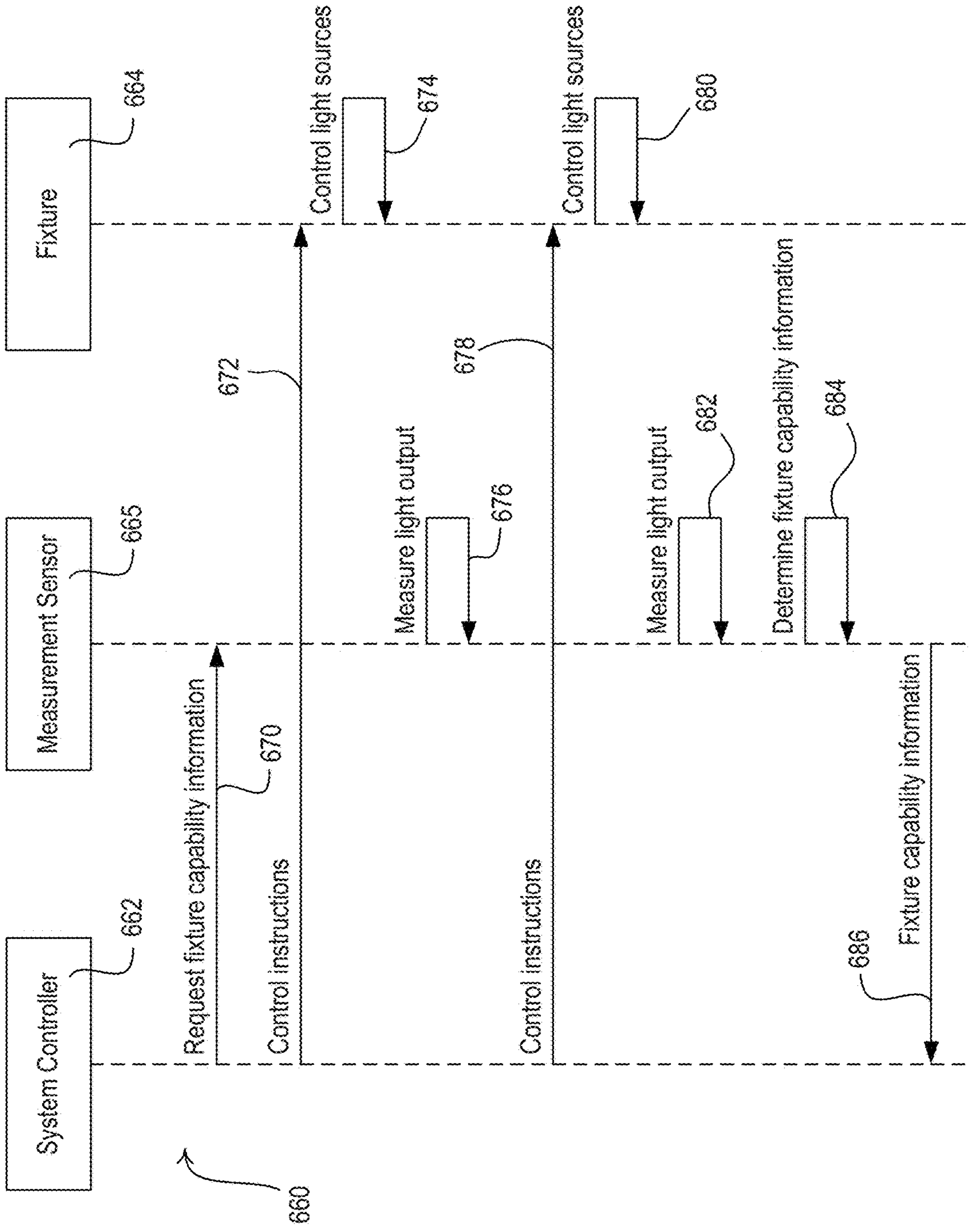
FIG. 6C is an example communication flow showing communications between a system controller and a lighting fixture to retrieve fixture capability information of the lighting fixture from a measurement sensor.

FIG. 6C is an example communication flow 660 showing communications between a system controller 662 (e.g., the system controller 110) and a lighting fixture 664 (e.g., lighting fixtures 120-126, 200, 250, 302) to retrieve fixture capability information of the lighting fixture from a measurement sensor 665. The lighting fixture 664 may include, for example, a multi-channel driver. At 670, the system controller 662 may transmit a message (e.g., a query message) to the measurement sensor 665 to request fixture capability information of the lighting fixture 664. For example, the measurement sensor 665 may be temporarily installed during commissioning of the lighting fixture 664. The measurement sensor 665 may be installed or placed such that the measurement sensor 665 may accurately measure the light output of the fixture (e.g., placed either on or inside of the lighting fixture and/or on a surface from which the light of the lighting fixture is shining). The measurement sensor 665 may be permanently installed (e.g., as a fixture sensor on or inside of the lighting fixture 664).

At 672, the system controller 662 may transmit control instructions to the lighting fixture 664. For example, the system controller may transmit control instructions to turn on only one of the light sources of the lighting fixture 664 at 672. At 674, the multi-channel driver of the lighting fixture 664 may control the light sources in response to the received control instructions. At 676, the measurement sensor 665 (e.g., in response to a command from the system controller) may measure the light output of the lighting fixture 664 (e.g., with only one light source on). At 678, the system controller 662 may once again transmit controller instructions to the lighting fixture 664, for example, to turn on another one of the light sources of the lighting fixture 664 individually. The control instructions transmitted at 678 may differ from the control instructions transmitted at 672. The multi-channel driver of the lighting fixture 664 may control the light sources at 680, and the measurement sensor 665 may measure the light output of the lighting fixture 664 at 682. The system controller 662 may continue to transmit control instructions and the measurement sensor 665 may continue to measure the light output until the lighting fixture 664 has been run through the extent of its controllability (e.g., until each light source of the lighting fixture has been individually turned on and/or dimmed from high through low end).

At 684, the measurement sensor 665 (e.g., in response to a command from the system controller) may determine the fixture capability information for the lighting fixture 664, for example, based on the light output measurements recorded at 676 and 682. At 686, the measurement sensor 665 may transmit the fixture capability information to the system controller 662. After the system controller 662 has received the fixture capability information for the lighting fixture 664 as well as other lighting fixtures in the room, the system controller 662 may determine room capability information based on the fixture capability information received from the lighting fixtures (e.g., similar to 616 in FIG. 6A). The system controller 662 may then generate and transmit control instructions to control the lighting fixture 664 (and other lighting fixtures), for example, in response to receiving a command to adjust the color temperature of the lighting fixtures (e.g., similar to 618-624 in FIG. 6A). Alternatively, the measurement sensor 665 may transmit the measured light output to the system controller 662 and the system controller may determine the fixture capability information from the measurements provided by the measurement sensor.

Figure 7:
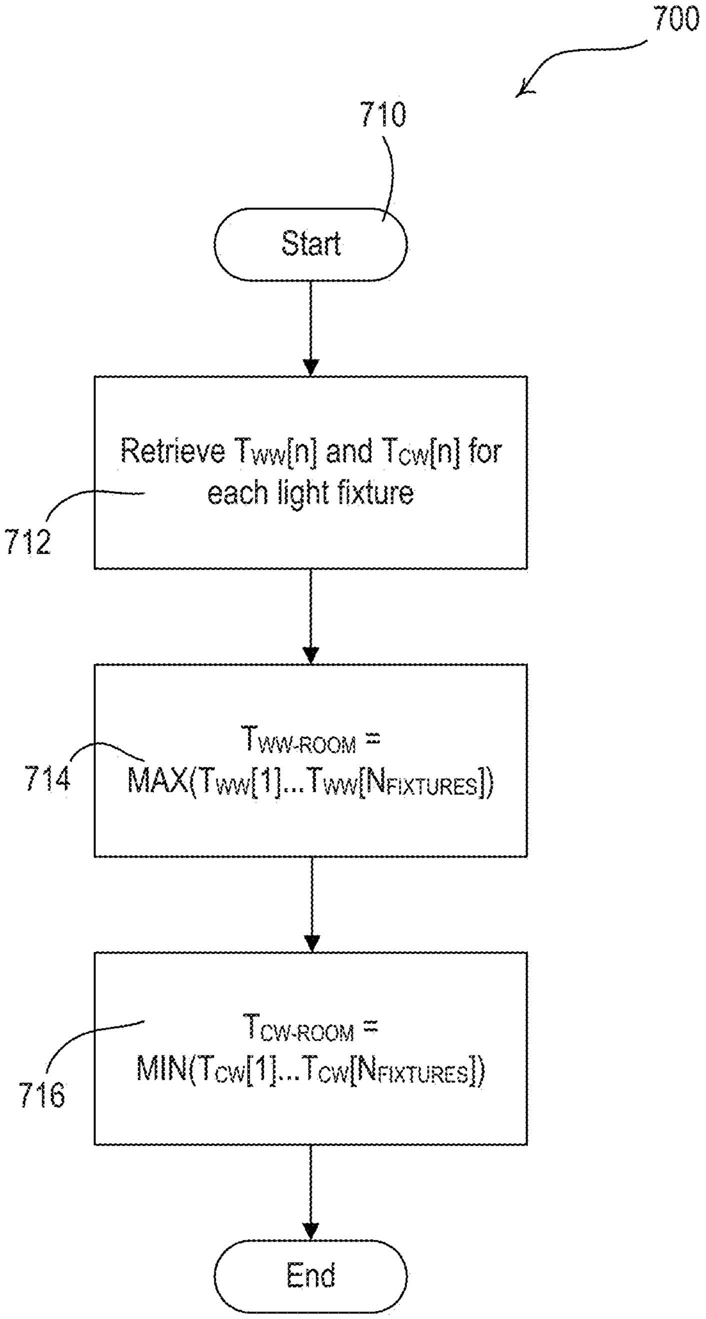
FIG. 7 is an example flowchart of a room capabilities procedure for determining at least a portion of the room capability information for a room based on fixture capability information for some or all of the lighting fixtures in the room.

FIG. 7 is an example flowchart of a room capabilities procedure 700 for determining at least a portion of the room capability information for a room based on fixture capability information for some or all of the lighting fixtures in the room. For example, the room capabilities procedure 700 may be executed by a system controller of a load control system (e.g., the system controller 110 of the load control system 100) during commissioning of the load control system (e.g., as shown at 518 and 520 of the configuration procedure 500 in FIG. 5). As described above, the system controller may obtain fixture capability information for some or all lighting fixtures (e.g., at shown at 512-516 of the configuration procedure 500 in FIG. 5). For example, a room may include one or more lighting fixtures (e.g., as shown in FIG. 1). The system controller may obtain fixture capability information for each lighting fixture. The fixture capability information of each lighting fixture may include a correlated color temperature (CCT) range within which the lighting fixture may be capable of operating. The color temperature range for each lighting fixture may range between a warm-white (WW) color temperature $T_{WW}$ and a cool-white (CW) color temperature $T_{CW}$. The system controller may determine common characteristics of the lighting fixtures in a room based on the fixture capability information.

The room capabilities procedure 700 may start at 710. At 712, the system controller may retrieve fixture capability information related to color temperature ranges for each of the lighting fixtures within a room. For example, the color temperature range for each lighting fixture may range between a warm-white color temperature value $T_{WW}[n]$ and a cool-white color temperature value $T_{CW}[n]$, where each fixture is represented by the variable n (e.g., an integer) that ranges from one to a total number $N_{FIXTURES}$ of lighting fixtures in the room.

At 714, the system controller may set the room warm-white color temperature value $T_{WW\text{-}ROOM}$ to the maximum value of the warm-white color temperature values $T_{WW}[n]$ of all lighting fixtures in the room. At 716, the system controller may set the cool-white color temperature value $T_{CW\text{-}ROOM}$ to the minimum value of the cool-white color temperature values $T_{CW}[n]$ of all lighting fixtures in the room. For example, the system controller may compare the warm-white color temperature values $T_{WW}[n]$ of all the lighting fixtures and/or the cool-white color temperature values $T_{CW}[n]$ of all lighting fixtures. The system controller may then determine room capability information for the lighting fixtures, for example, a room warm-white color temperature value $T_{WW\text{-}ROOM}$ and/or a room cool-white color temperature value $T_{CW\text{-}ROOM}$.

For example, a first lighting fixture may be characterized by a color temperature range between a warm-white color temperature value $T_{WW}[1]$ of 3000 K and a cool-white color temperature value $T_{CW}[1]$ of 5000 K. A second lighting fixture may be characterized by a color temperature range between a warm-white color temperature value $T_{WW}[2]$ of 2000 K and a cool-white color temperature value $T_{CW}[2]$ of 4000 K. The least common range of 3000-5000 K and the 2000-4000 K is 3000-4000 K. The system controller may set the room warm-white color temperature value $T_{WW\text{-}ROOM}$ to 3000 K and the room cool-white color temperature value $T_{CW\text{-}ROOM}$ to 4000 K. The system controller may then limit the controlled color temperature range of all of the lighting fixtures in the room to a value between the room warm-white color temperature value $T_{WW\text{-}ROOM}$ and the room cool-white color temperature value $T_{CW\text{-}ROOM}$ (e.g., between 3000-4000 K).

Figure 8A:
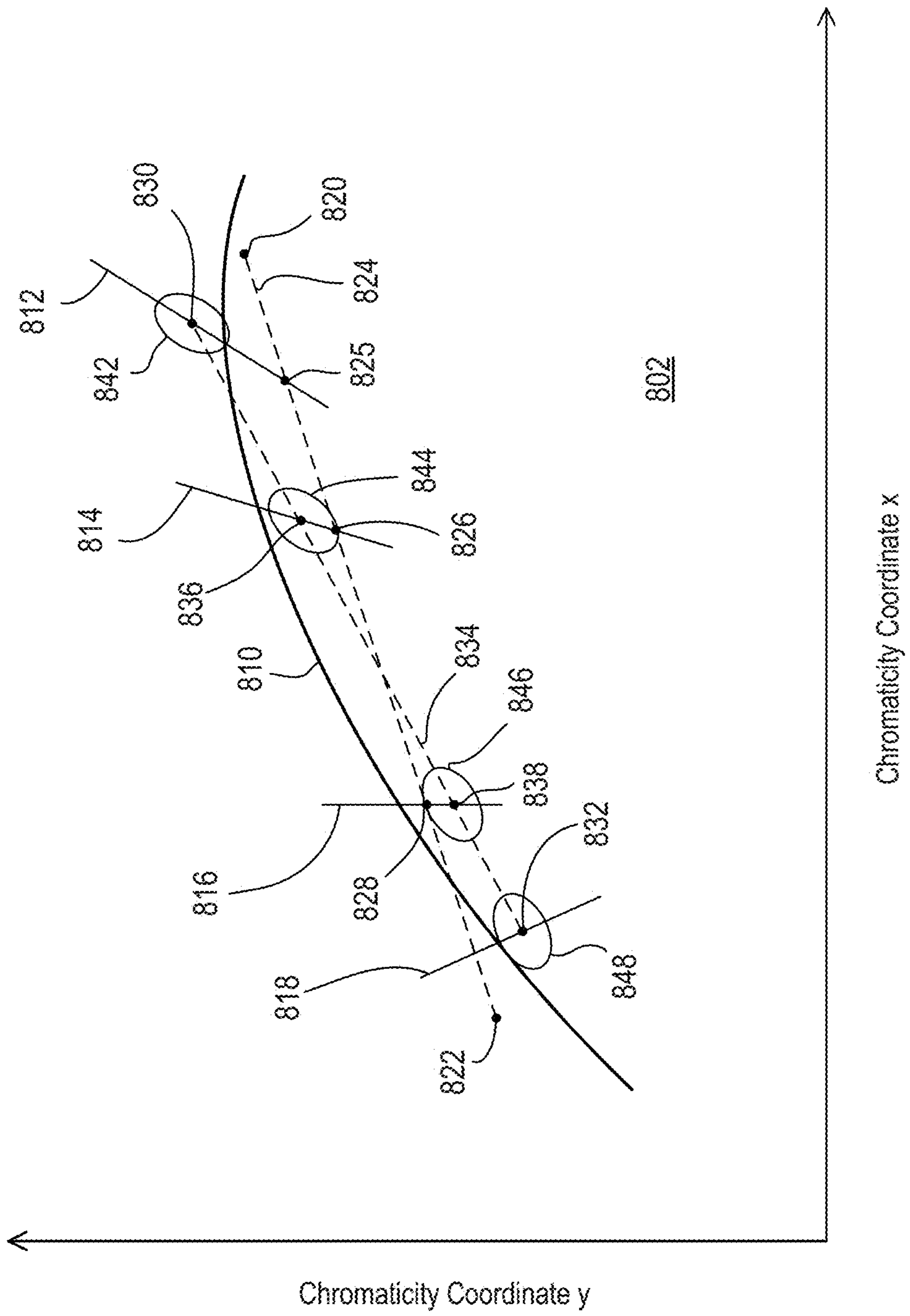
FIG. 8A is a diagram of a portion of a chromaticity coordinate system illustrating a section of a black body radiator curve and MacAdam ellipses.

FIG. 8A is a diagram of a portion of a chromaticity coordinate system 802 showing a section of a black body radiator curve 810. The chromaticity coordinate system 802 may have a chromaticity coordinate x along the x-axis and a chromaticity coordinate y along the y-axis. Each coordinate (x, y) in the chromaticity coordinate system 802 may represent a different color in the red-green-blue (RGB) color space (e.g., the CIE 1931 RGB color space). Each coordinate along the block body radiator curve 810 may represent a "white" color having a different color temperature. The "white" colors along the black body radiator curve 810 may range from a warm-white color temperature (e.g., 2000 K) to a cool-white color temperature (e.g., 10,000 K), for example, corresponding to the color of light radiated by a black body heated to that respective temperature. The black body radiator curve 810 is intersected by iso temperature lines (e.g., such as example lines 812-818 shown FIG. 8A), which are straight lines that represent colors that are visually characterized by the same color temperature.

The system controller may control lighting fixtures in a room to adjust the light emitted by the lighting fixtures along or close to the black body radiator curve. To emit light at different colors and color temperatures, multiple light sources of a lighting fixture may be characterized by different colors (e.g., having different chromaticity coordinates). The colors and color temperatures of a cumulative light that may be emitted by the lighting fixture may be limited by the number and colors (e.g., locations of the chromaticity coordinates) of the light sources in the lighting fixture. For example, in a lighting fixture that has two light sources at different color temperatures (e.g., such as the lighting fixture 200 shown in FIG. 2A), the possible colors of the cumulative light emitted by the lighting fixture may range along a line that extends between the chromaticity coordinates of the two light sources on the chromaticity coordinate system.

For example, as shown in FIG. 8A, a first lighting fixture may have a first light source (e.g., a warm-white light source) characterized by a warm-white chromaticity coordinate 820 and a second light source (e.g., a cool-white light source) characterized by a cool-white chromaticity coordinate 822. The first lighting fixture may be capable of generating light at color temperatures that range along a color range line 824 that extends between the warm-white and cool-white chromaticity coordinates 820, 822. The color range line 824 may be close to, but not exactly on, the black body radiator curve 810, so that the first lighting fixture can approximate the light output of a black body radiator.

The first lighting fixture may be located in a room with a second lighting fixture that has different light sources than the first lighting fixture. Even though the first and second lighting fixtures may be controlled to the same color temperature (e.g., on the same iso temperature line), the difference in the actual color of the lighting fixtures may be noticeable to the average human eye. For example, the second lighting fixture may be capable of generating light at color temperatures that range along a color range line 834 that extends between a warm-white chromaticity coordinate 830 and a cool-white chromaticity coordinate 832 as shown in FIG. 8A.

Each coordinate on the chromaticity coordinate system may be characterized by a MacAdam ellipse, which defines a region containing colors which are indistinguishable to the average human eye (e.g., such as example ellipses 842-848 shown FIG. 8A). For example, the first and second lighting fixtures may be controlled to the same color temperature along the iso temperature line 812, which runs through the warm-white chromaticity coordinate 830 of the second lighting fixture as shown in FIG. 8A. The first lighting fixture may be controlled to a first color defined by a chromaticity coordinate 825 at the intersection of the iso temperature 812 and the color range line 824. The second lighting fixture may be controlled to a second color defined by the chromaticity coordinate 825 at the intersection of the iso temperature 812 and the color range line 834 (e.g., the warm-white chromaticity coordinate 830 of the second lighting fixture). The warm-white chromaticity coordinate 830 of the second lighting fixture may be characterized by the MacAdam ellipse 842, which is centered at the warm-white chromaticity coordinate 830. However, since the chromaticity coordinate of the first color of the first lighting fixture is outside the MacAdam ellipse 842 of the second color of the second lighting fixture, the difference between the first and second color may be noticeable to the average human eye even though the first and second lighting fixtures are being controlled to the same color temperature along the iso temperature line 812. The size of a MacAdam ellipse may be referred to as a number of steps, where each step represents a standard deviation from the target color. For example, a 1-step MacAdam ellipse has a boundary that represents one standard deviation from the target color.

Figure 8B:
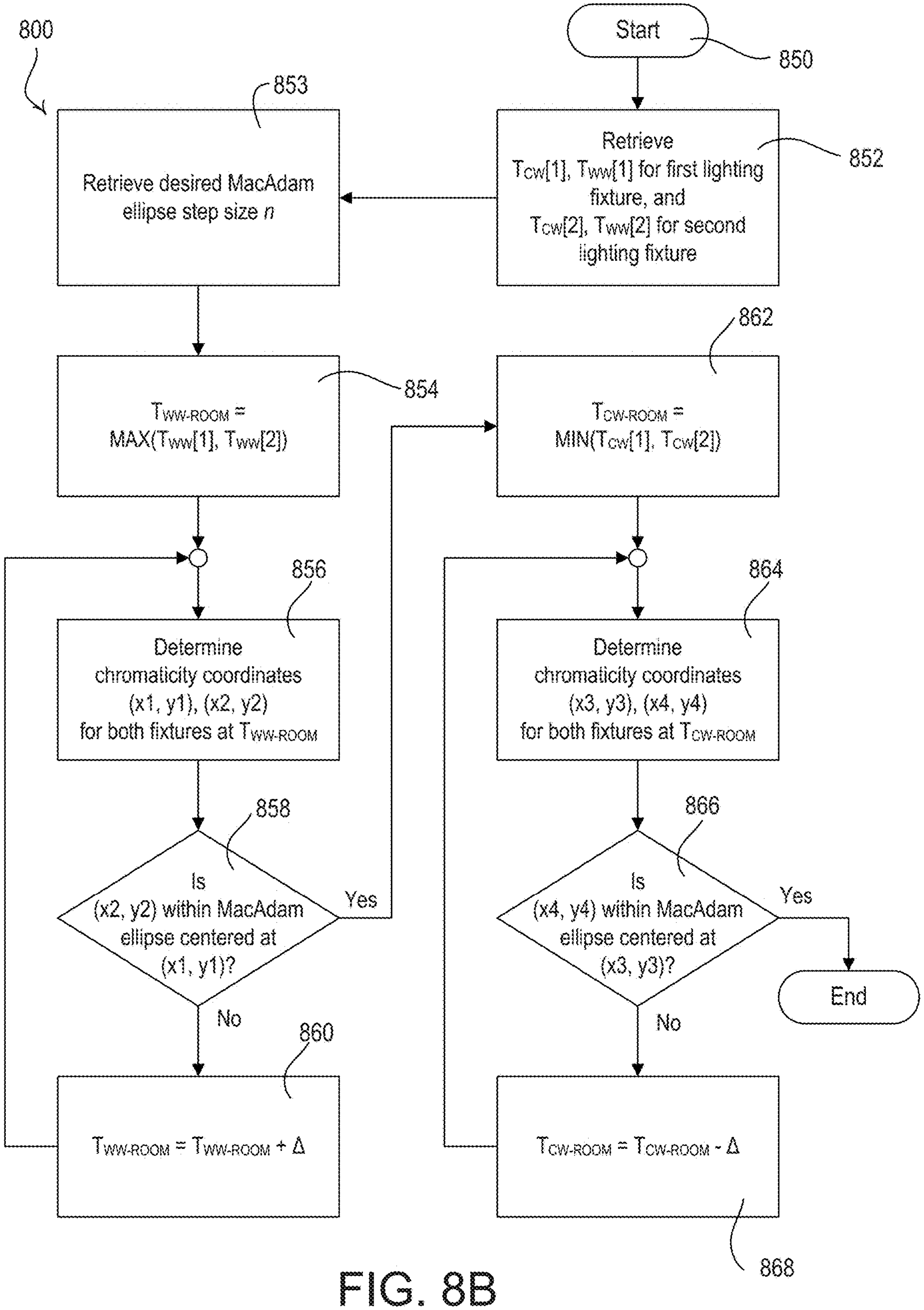
FIG. 8B is an example flowchart of a room capabilities procedure for determining at least a portion of the room capability information for a room based on fixture capability information for some or all of the lighting fixtures in the room using MacAdam ellipses.

The system controller may be configured to set the room capability information of the first and second lighting fixtures to ensure that the colors of the first and second lighting fixtures are within a MacAdam ellipse of each other when the lighting fixtures are controlled to the same color temperature, where the MacAdam ellipse is characterized by a number of steps, e.g., a 1-step or 2-step MacAdam ellipse. FIG. 8B is an example flowchart of a room capabilities procedure 800 for determining room capability information for a room to ensure that same color temperatures of the first and second lighting fixtures are within a MacAdam ellipse of each other. For example, the room capabilities procedure 800 may be executed by a system controller of a load control system (e.g., the system controller 110 of the load control system 100) during commissioning of the load control system (e.g., as shown at 518 and 520 of the configuration procedure 500 in FIG. 5).

The room capabilities procedure 800 may start at 850. At 852, the system controller may retrieve color temperature range information for some or all lighting fixtures within a room from the fixture capability information. For example, the room may include the first lighting fixture and the second lighting fixture discussed above with reference to FIG. 8A. The first light fixture may be characterized by a color temperature range between a warm-white color temperature value $T_{WW}[1]$ and a cool-white color temperature value $T_{CW}[1]$, and the second lighting fixture may be characterized by a color temperature range between a warm-white color temperature value $T_{WW}[2]$ and a cool-white color temperature value $T_{CW}[2]$. At 853, the system controller may retrieve a desired step size n for the MacAdam ellipses. For example, the desired step size n may be set based on a desired tolerance for the differences in the color of the first and second light fixtures.

The system controller may first determine a room warm-white color temperature $T_{WW\text{-}ROOM}$ for the warm-white end of the color temperature range. At 854, the system controller may initially set the room warm-white color temperature value $T_{WW\text{-}ROOM}$ to the maximum value of the warm-white color temperature values $T_{WW}[1]$, $T_{WW}[2]$ of both of the lighting fixtures. For example, as shown in FIG. 8A, the iso temperature line 812 may represent the room warm-white color temperature $T_{WW\text{-}ROOM}$. At 856, the system controller may determine chromaticity coordinates of the colors of the first and second lighting fixtures at the initial room warm-white color temperature $T_{WW\text{-}ROOM}$. For example, the system controller may determine a first chromaticity coordinate (x1, y1) at the intersection of the iso temperature 812 and the first color range line 824 (e.g., as shown in FIG. 8A), and a second chromaticity coordinate (x2, y2) at the intersection of the iso temperature 812 and the second color range line 834 (e.g., the warm-white chromaticity coordinate 830 of the second lighting fixture).

The chromaticity coordinates (x1, y1) and (x2, y2) at the initial room warm-white color temperature value $T_{WW\text{-}ROOM}$ may or may not be within an n-step MacAdam ellipse of each other. For example, as shown in FIG. 8A, the first chromaticity coordinate (x1, y1) at the intersection of the iso temperature 812 and the first color range line 824 is outside of the MacAdam ellipse 842 centered at the second chromaticity coordinate (x2, y2) at the intersection of the iso temperature 812 and the second color range line 834 (e.g., the warm-white chromaticity coordinate 830 of the second lighting fixture).

At 858, the system controller may determine whether the chromaticity coordinates (x1, y1) and (x2, y2) are within an n-step MacAdam ellipses of each other. For example, the system controller may determine whether the first chromaticity coordinate (x1, y1) is within a 2-step MacAdam ellipse centered at the second chromaticity coordinate (x2, y2) and/or whether the second chromaticity coordinate (x2, y2) is within a 2-step MacAdam ellipse centered at the first chromaticity coordinate (x1, y1) at 858.

If the chromaticity coordinates (x1, y1) and (x2, y2) are not within an n-step MacAdam ellipse of each other at 858, the system controller may increase the room warm-white color temperature value $T_{WW\text{-}ROOM}$ by an increment value $\Delta_{INC}$ (e.g., one Kelvin) at 860 and loop back to 856 to determine updated chromaticity coordinates (x1, y1) and (x2, y2) of the colors of the first and second lighting fixtures at the increased room warm-white color temperature value $T_{WW\text{-}ROOM}$ at 856. The system controller may continue increasing the room warm-white color temperature $T_{WW\text{-}ROOM}$ at 860 and updating the chromaticity coordinates (x1, y1) and (x2, y2) at 856 until the chromaticity coordinates (x1, y1) and (x2, y2) are within an n-step MacAdam ellipse of each other at 858. For example, the final warm-white color temperature value $T_{WW\text{-}ROOM}$ may be represented by the iso temperature line 814, and the final chromaticity coordinates (x1, y1) and (x2, y2) may be at chromaticity coordinates 826, 836 as shown in FIG. 8A, which are within an n-step MacAdam ellipse 844 of each other.

When the chromaticity coordinates (x1, y1) and (x2, y2) are within an n-step MacAdam ellipse of each other at 858, the system controller may determine a room cool-white color temperature value $T_{CW\text{-}ROOM}$ for the cool-white end of the color temperature range. The system controller may initially set the room cool-white color temperature value $T_{CW\text{-}ROOM}$ to the minimum value of the cool-white color temperature values $T_{CW}[1]$ and $T_{CW}[2]$ of both of the lighting fixtures at 862. For example, as shown in FIG. 8A, the iso temperature line 818 may represent the room cool-white color temperature $T_{CW\text{-}ROOM}$. At 864, the system controller may determine chromaticity coordinates of the colors of the first and second lighting fixtures at the initial room cool-white color temperature value $T_{CW\text{-}ROOM}$. For example, the system controller may determine a third chromaticity coordinate (x3, y3) at the intersection of the iso temperature line 818 and the first color range line 824 (e.g., as shown in FIG. 8A), and a fourth chromaticity coordinate (x4, y4) at the intersection of the iso temperature 818 and the second color range line 834 (e.g., the cool-white chromaticity coordinate 832 of the second lighting fixture).

The chromaticity coordinates (x3, y3) and (x4, y4) at the initial room cool-white color temperature value $T_{CW\text{-}ROOM}$ may or may not be within an n-step MacAdam ellipse. For example, as shown in FIG. 8A, the third chromaticity coordinate (x3, y3) at the intersection of the iso temperature 818 and the first color range line 824 is outside the MacAdam ellipse 848 centered at the fourth chromaticity coordinate (x4, y4) at the intersection of the iso temperature 818 and the second color range line 834.

At 866, the system controller may determine whether the chromaticity coordinates (x3, y3) and (x4, y4) are within an n-step MacAdam ellipse of each other. For example, the system controller may determine whether the third chromaticity coordinate (x3, y3) is within a 2-step MacAdam ellipse centered at the fourth chromaticity coordinate (x4, y4) and/or whether the fourth chromaticity coordinate (x4, y4) is within a 2-step MacAdam ellipse centered at the third chromaticity coordinate (x3, y3) at 866. If the chromaticity coordinates (x3, y3) and (x4, y4) are within an n-step MacAdam ellipse of each other at 866, the system controller may decrease the cool-white color temperature value $T_{CW\text{-}ROOM}$ by a decrement value $\Delta_{DEC}$ (e.g., one Kelvin) at 868 and determine updated chromaticity coordinates (x3, y3) and (x4, y4) of the colors of the first and second lighting fixtures at the decreased room cool-white color temperature value $T_{CW\text{-}ROOM}$ at 864. The system controller may continue decreasing the room cool-white color temperature value $T_{CW\text{-}ROOM}$ at 868 and updating the chromaticity coordinates (x3, y3) and (x4, y5) at 864 until the chromaticity coordinates (x3, y3) and (x4, y4) are within an n-step MacAdam ellipse of each other at 866, at which time, the room capabilities procedure 800 may exit. For example, the final cool-white color temperature value $T_{CW\text{-}ROOM}$ may be represented by the iso temperature line 816, and the final chromaticity coordinates (x3, y3) and (x4, y4) may be at chromaticity coordinates 828, 838 as shown in FIG. 8A.

The system controller may save the final values of the room warm-white color temperature value $T_{WW\text{-}ROOM}$ and the room cool-white color temperature value $T_{CW\text{-}ROOM}$ in the room capability information for the first and second lighting fixtures. In addition, the system controller may store the final chromaticity coordinates to limit the first lighting fixture between the first chromaticity coordinate (x1, y1) and the third chromaticity coordinate (x3, y3), and to limit the second lighting fixture between the second chromaticity coordinate (x2, y2) and the fourth chromaticity coordinate (x4, y4). The system controller may send the final values of the room warm-white color temperature value $T_{WW\text{-}ROOM}$ and room cool-white color temperature value $T_{CW\text{-}ROOM}$ and/or the final chromaticity coordinates to the respective lighting fixtures.

Figure 9A:
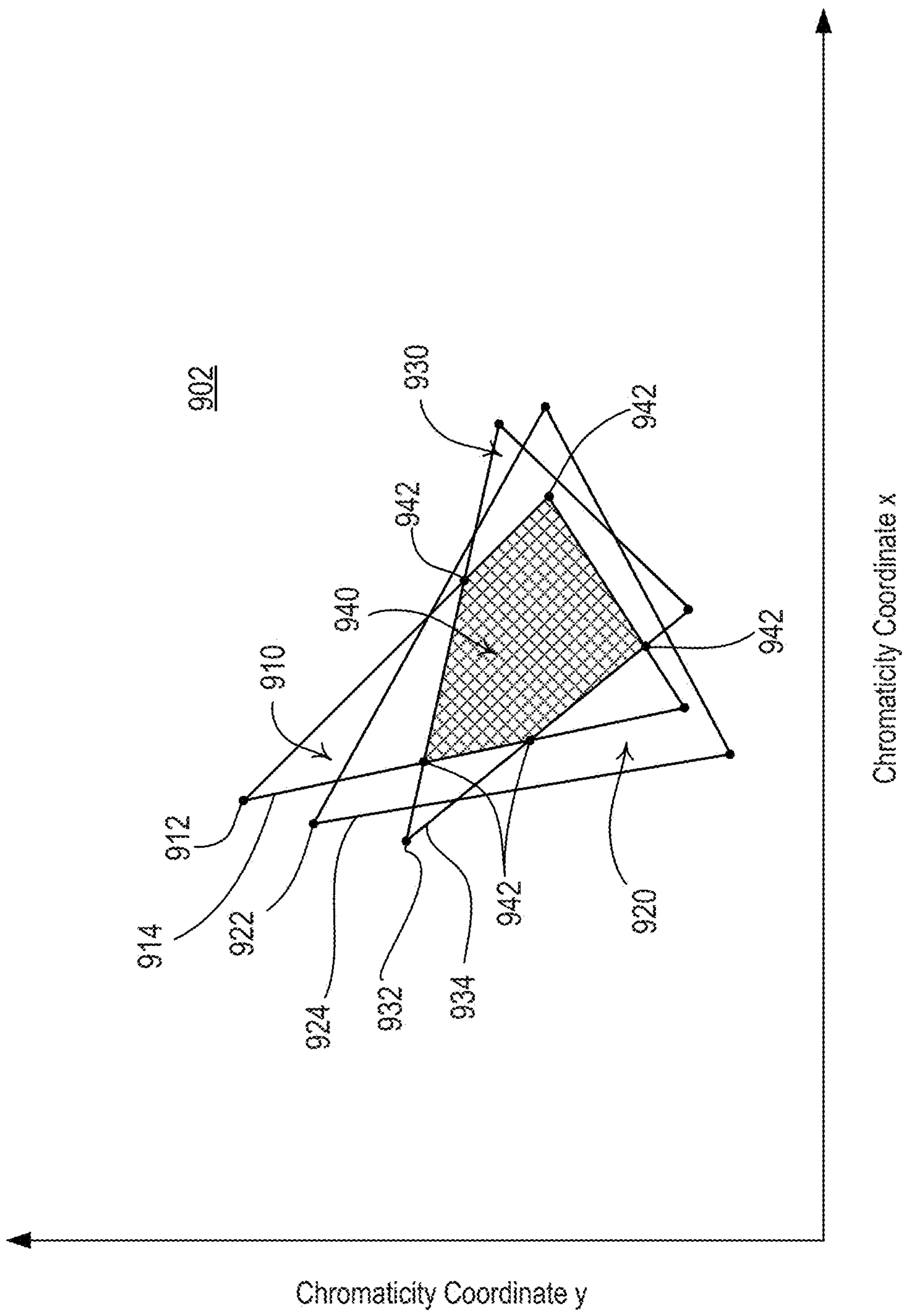
FIG. 9A is a diagram of a portion of a chromaticity coordinate system illustrating color gamuts of lighting fixtures that each have three light sources.

In a lighting fixture that has three or more light sources at different colors or color temperatures (e.g., such as the lighting fixture 250 shown in FIG. 2B), the possible colors of the cumulative light emitted by the lighting fixture may range with an areas defined by the chromaticity coordinates of the multiple light sources on the chromaticity coordinate system. FIG. 9A is a diagram of a portion of a chromaticity coordinate system 902 illustrating color gamuts of lighting fixtures that each have three light sources. For example, a first lighting fixture may have a three light sources characterized by chromaticity coordinates 912 that may be connected by gamut-edge lines 914 to define a first color gamut 910 (e.g., a triangular color space). Similarly, the second and third lighting fixtures may each have respective chromaticity coordinates 922, 932 that may be connected by respective gamut-edge lines 924, 934 to define second and third color gamuts 920, 930, respectively. The first, second, and third lighting fixture may each be capable of generating light at color and/or color temperatures that are located at chromaticity coordinates with the area of the respective color gamuts 910, 920, 930. Since each lighting fixture is able to emit light at a color that falls outside the color gamuts of the other lighting fixtures, the system controller may be configured to set the room capability information of the first, second, and third lighting fixtures to ensure that the colors of the first, second, and third lighting fixtures are limited to an overlapping color gamut 940, which may define a room color gamut for the lighting fixtures in the room. The overlapping color gamut 940 may be defined by the chromaticity coordinates 942 at the corners of the overlapping color gamut.

Figure 9B:
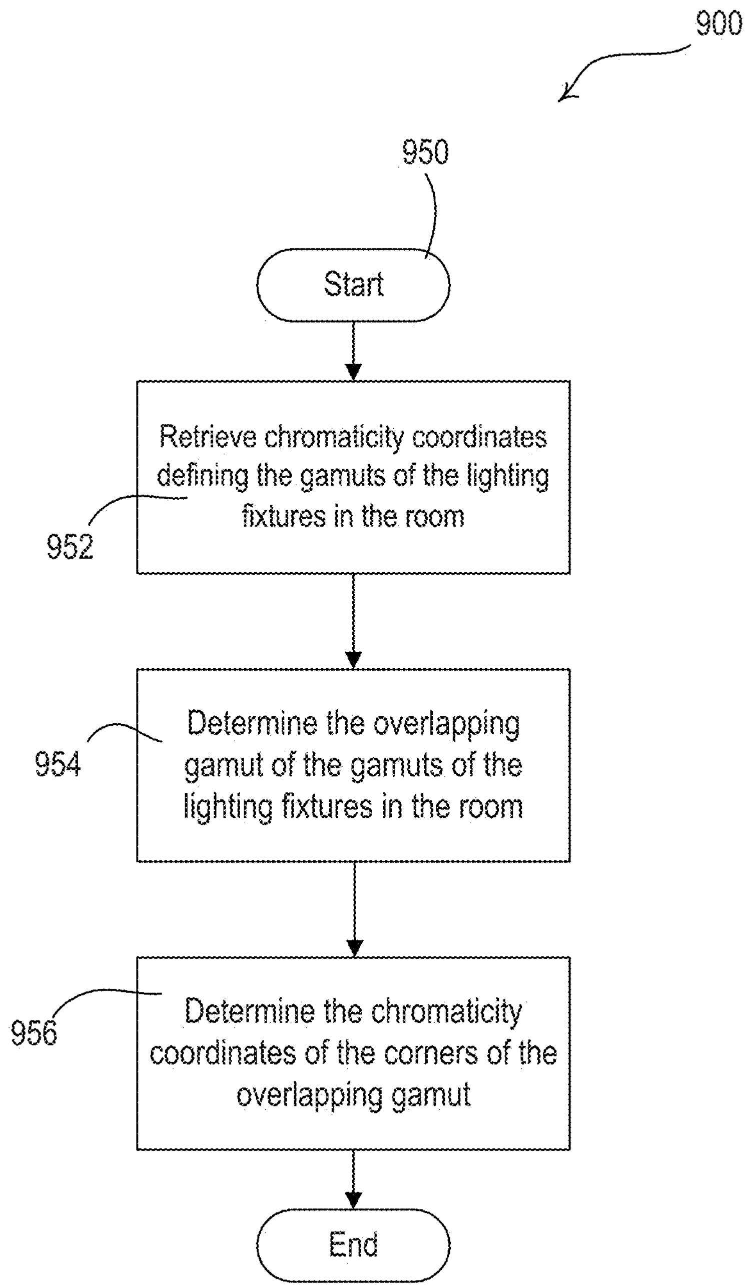
FIG. 9B is an example flowchart of a room capabilities procedure for determining room capability information for a room to ensure that the colors of multiple lighting fixtures in the room are limited to an overlapping color gamut of the color gamuts of the multiple lighting fixtures.

FIG. 9B is an example flowchart of a room capabilities procedure 900 for determining room capability information for a room to ensure that the colors of the first, second, and third lighting fixtures in the room are limited to an overlapping color gamut of the color gamuts of the multiple lighting fixtures. For example, the room capabilities procedure 900 may be executed by a system controller of a load control system (e.g., the system controller 110 of the load control system 100) during commissioning of the load control system (e.g., as shown at 518 and 520 of the configuration procedure 500 in FIG. 5). The room capabilities procedure 900 may start at 950. At 952, the system controller may retrieve color gamut information for some or all lighting fixtures within a room from fixture capability information. For example, the system controller may retrieve the chromaticity coordinates that define the area of the color gamut (e.g., the chromaticity coordinates at the corners of the gamut) at 952 (e.g., the chromaticity coordinates 912, 922, 932 of the respective color gamuts 910, 920, 930 shown in FIG. 9A). At 954, the system controller may determine the overlapping color gamut of the color gamuts of the multiple lighting fixtures in the room (e.g., the overlapping gamut 940 shown in FIG. 9A). At 956, the system controller may determine the chromaticity coordinates of the corners of the overlapping color gamut (e.g., the chromaticity coordinates 942 shown in FIG. 9A), before the room capabilities procedure 900 exits.

The system controller may also be configured to set a color mixing curve (e.g., a color temperature tuning curve) in the room capability information of a room. If all of the lighting fixtures in the room are configurable, the system controller may be configured to set the color mixing curve to a desired color mixing curve (e.g., that may be selected by a user). The system controller may be configured to adjust the color mixing curve to ensure that the curve does not go outside the color gamut of any of the lighting fixtures. If there are unconfigurable lighting fixtures in the room, the system controller may be configured to match the color mixing curve to that of the lowest performing lighting fixture in the room.

Figure 10:
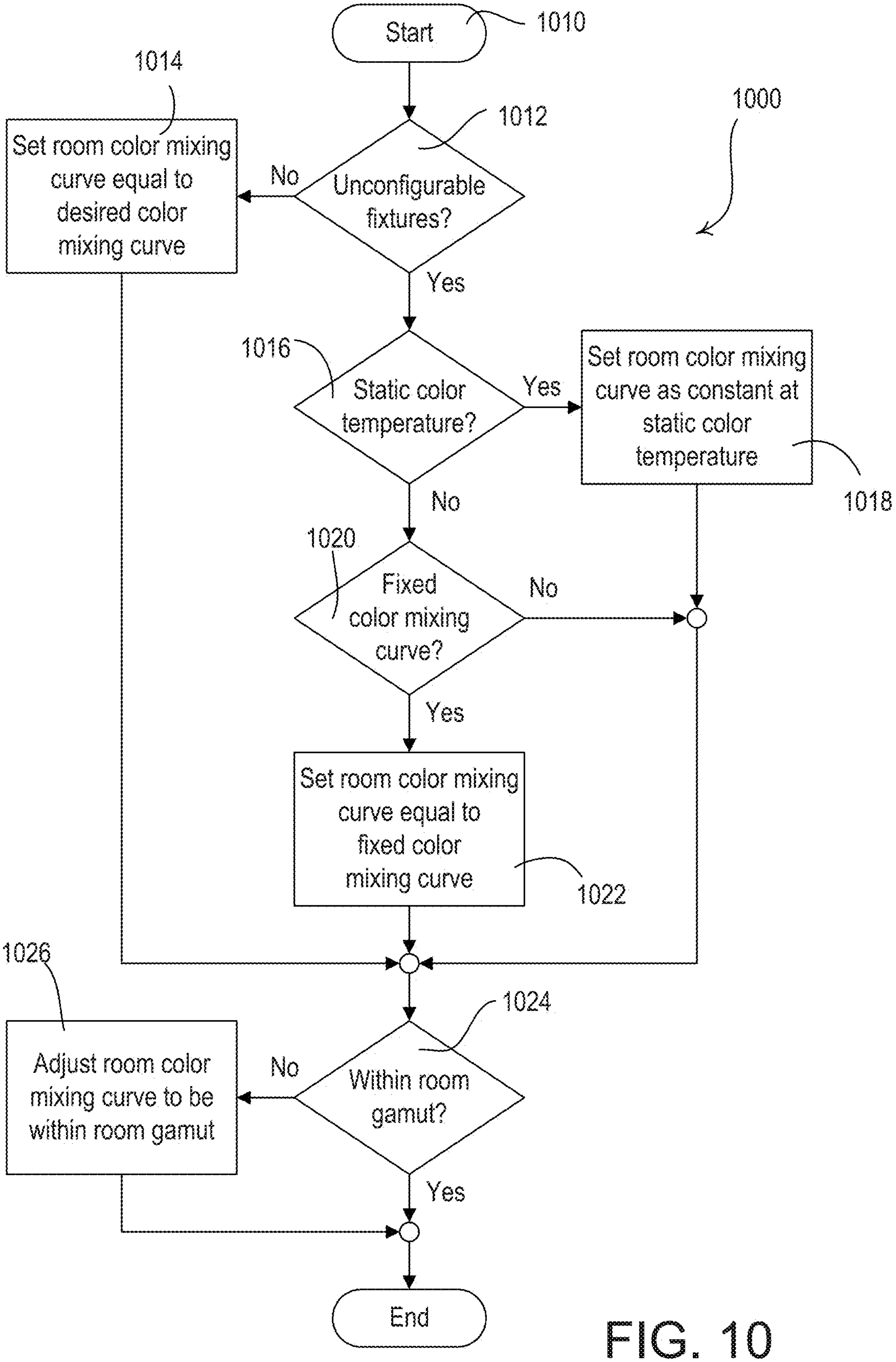
FIG. 10 is an example flowchart of a mixing curve configuration procedure for establishing a room color mixing curve that may be used by the lighting fixtures in a room.

FIG. 10 is an example flowchart of a mixing curve configuration procedure 1000 for establishing a room color mixing curve that may be used by the lighting fixtures (e.g., all of the lighting fixtures) in a room. For example, the room capabilities procedure 1000 may be executed by a system controller of a load control system (e.g., the system controller 110 of the load control system 100) during commissioning of the load control system (e.g., as shown at 518 and 520 of the configuration procedure 500 in FIG. 5). The room capabilities procedure 1000 may start at 1010. The system controller may determine whether there are unconfigurable fixtures in the room. If there are not unconfigurable fixtures in the room at 1012, the system controller may set the room color mixing source relatively equal to a desired color mixing curve at 1014. If there are unconfigurable lighting fixtures in the room at 1012, the system controller may determine what type of configurable lighting fixtures are in the room. The system controller may also determine whether the unconfigurable lighting fixtures can only be controlled to a static (e.g., fixed) color temperature. If the unconfigurable lighting fixtures can only be controlled to a static (e.g., fixed) color temperature at 1016, the system controller may set the room color mixing curve as a constant value at the static color temperature of the uncontrollable lighting fixtures at 1018. The system controller may determine whether the unconfigurable lighting fixtures can only be controlled according to a fixed color mixing curve. If the unconfigurable lighting fixtures can only be controlled according to a fixed color mixing curve at 1020, the system controller may set the room color mixing curve equal to the fixed color mixing curve at 1022.

After setting the room color mixing curve at one or more of 1012, 1018, or 1022, the system controller may determine whether the resulting room color mixing curve is entirely within a room color gamut or extends outside the room color gamut at 1024. If the room color mixing curve is entirely within the room color gamut at 1024, the system controller may not modify the room color mixing curve, and the mixing curve configuration procedure 1000 may exit. If the room color mixing curve extends outside the room color gamut at 1024, the system controller may adjust the room color mixing curve to be within the room color gamut at 1026, before the mixing curve configuration procedure 1000 exits.

According to another example, a lighting fixture may be configured to operate in a power-limiting mode. For example, the lighting fixture may be configured to ensure that the power consumed by the light sources and/or the LED driver of the lighting fixture does not exceed a maximum power threshold $P_{MAX}$ across the color temperature range of the lighting fixture. The lighting fixture may also be configured to control the light output of the lighting fixture to a constant light intensity $L_{CNST}$ (e.g., a constant lumen output) when operating in the power-limiting mode. For example, the lighting fixture may be configured with the constant light intensity $L_{CNST}$ during manufacturing of the lighting fixture (e.g., using the measurement tool 300 at an OEM). After installation, the lighting fixture may be configured to control the light output of the lighting fixture to the constant light intensity $L_{CNST}$ as the color temperature of the lighting fixture is adjusted between the fixture warm-white color temperature value $T_{WW}$ and the fixture cool-white color temperature value $T_{CW}$ of the lighting fixture.

In addition, the lighting fixture may be configured with the constant light intensity $L_{CNST}$ during commissioning (e.g., after the room capability information has been determined), such that the lighting fixture is configured to control the light output of the lighting fixture to the constant light intensity $L_{CNST}$ as the color temperature of the lighting fixture is adjusted between the room warm-white color temperature value $T_{WW-ROOM}$ and the room cool-white color temperature value $T_{CW-ROOM}$. The constant light intensity $L_{CNST}$ may also function as a maximum light intensity for the lighting fixture (e.g., the lighting fixture may be dimmed below the constant light intensity $L_{CNST}$).

Figure 11A:
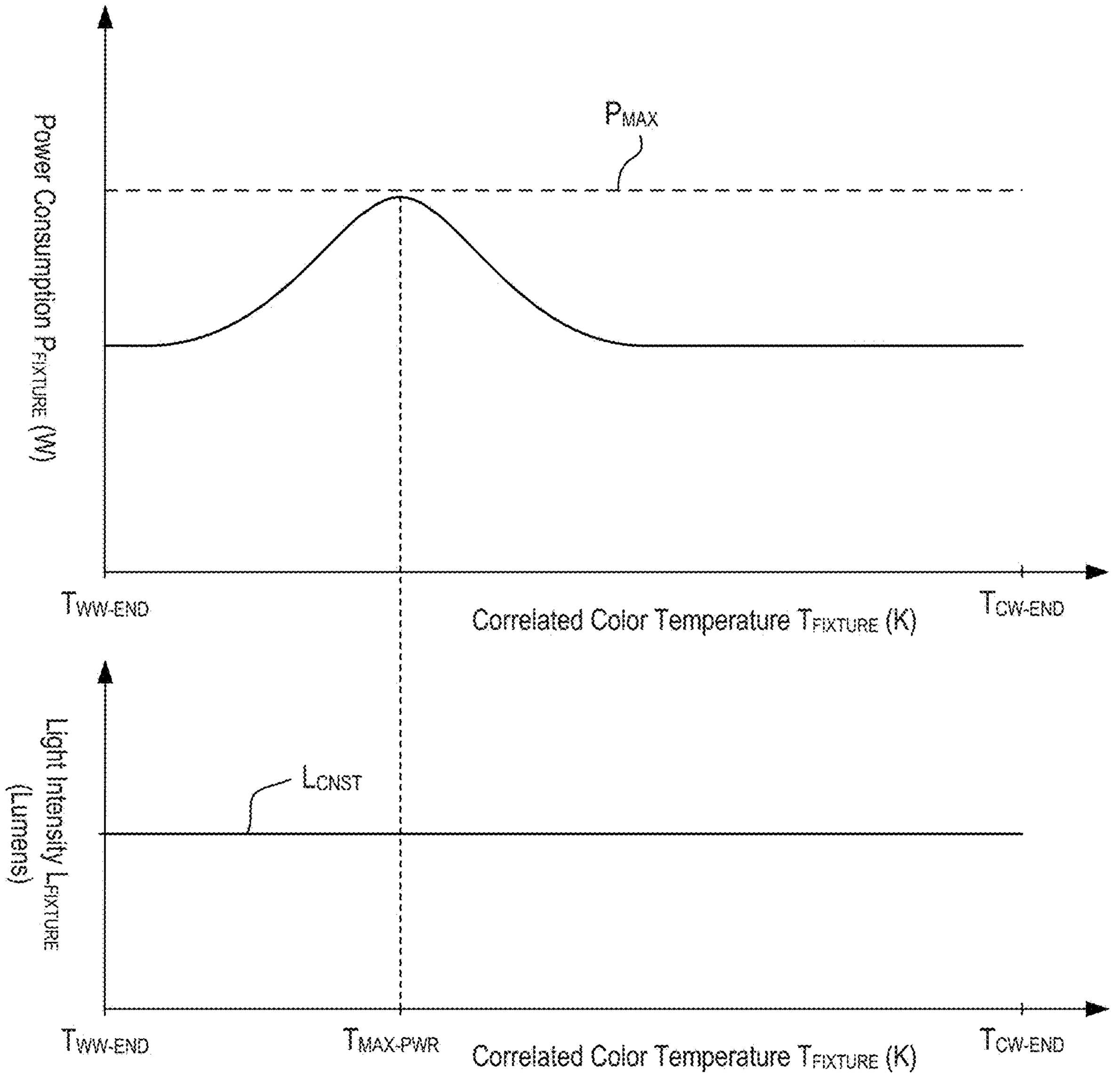
FIG. 11A illustrates example plots of a power consumption and a light intensity with respect to a correlated color temperature of a lighting fixture when operating in a power-limiting mode.

FIG. 11A illustrates example plots of a power consumption $P_{FIXTURE}$ and a light intensity $L_{FIXTURE}$ with respect to a correlated color temperature $T_{FIXTURE}$ of a lighting fixture when operating in the power-limiting mode. As shown, the light intensity $L_{FIXTURE}$ of the lighting fixture may be held constant at the constant light intensity $L_{CNST}$ as the color temperature $T_{FIXTURE}$ is adjusted across the color temperature range of the lighting fixture (e.g., between an endpoint warm-white color temperature value $T_{WW-END}$ and an endpoint cool-white color temperature value $T_{CW-END}$. The power consumption for the lighting fixture may peak at a particular color temperature $T_{MAX-PWR}$. The constant light intensity $L_{CNST}$ may be chosen such that the power consumption $P_{FIXTURE}$ of the lighting fixture at the color temperature $T_{MAX-PWR}$ does not exceed the maximum power threshold $P_{MAX}$.

Figure 11B:
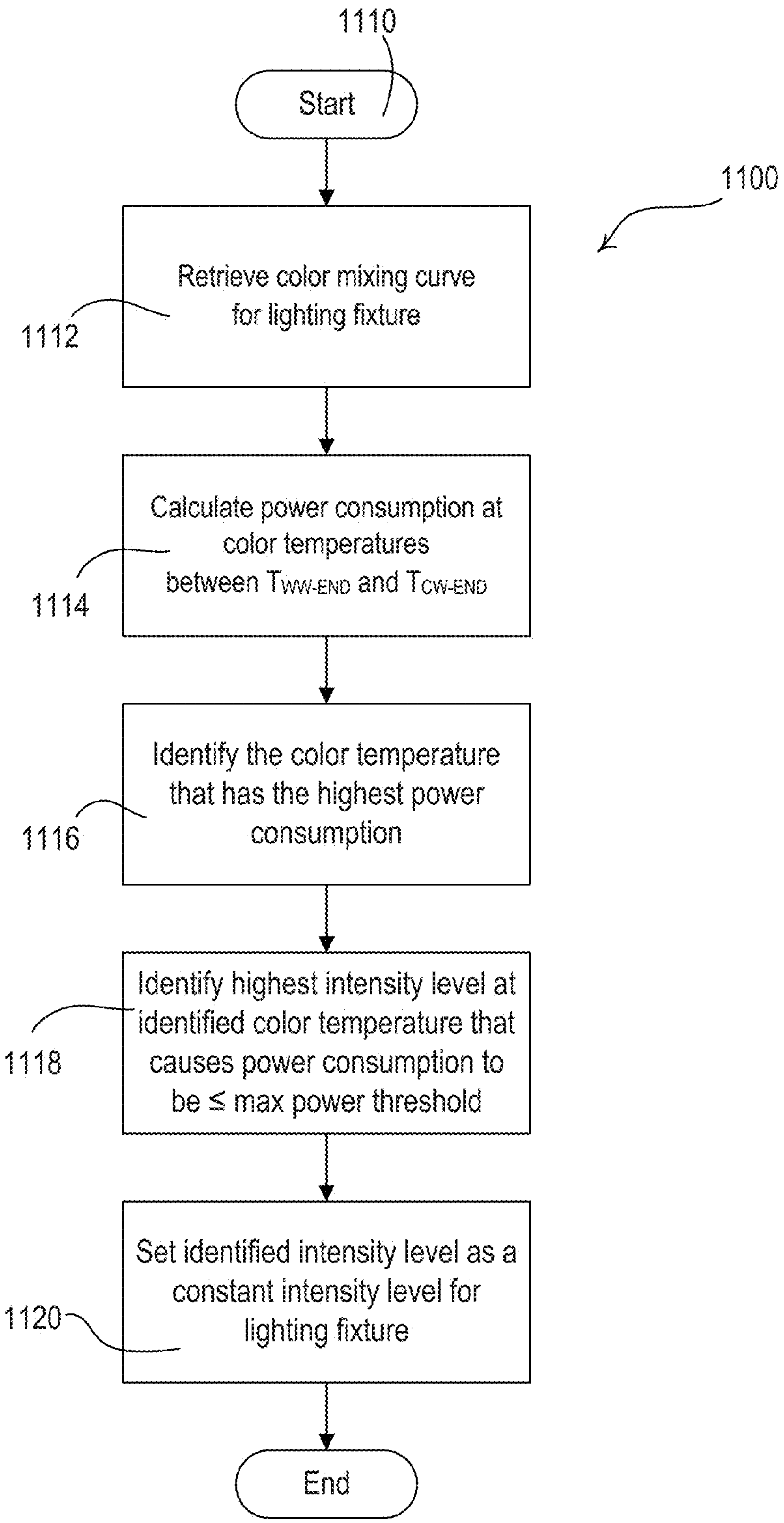
FIG. 11B is an example flowchart of a power-limiting mode configuration procedure for determining a constant light intensity to which a lighting fixture may be controlled to limit the power consumption of the lighting fixture below a maximum power threshold.

FIG. 11B is an example flowchart of a power-limiting mode configuration procedure 1100 for determining a constant light intensity $L_{CNST}$ to which a lighting fixture may be controlled to limit the power consumption of the lighting fixture below a maximum power threshold $P_{MAX}$. For example, the power-limiting mode configuration procedure 1100 may be executed by a processing device (e.g., the system controller 310 and/or the processing device 320 of the measurement tool 300) during manufacturing of the lighting fixture. In addition, the power-limiting mode configuration procedure 1100 may be executed by a system controller of a load control system (e.g., the system controller 110 of the load control system 100) during commissioning of the load control system. The power-limiting mode configuration procedure 1100 may start at 1110. At 1112, the processing device may retrieve a color mixing curve for the lighting fixture. For example, the color mixing curve may be stored in memory in the lighting fixture and/or may be determined during commissioning of the lighting fixture (e.g., during the mixing curve configuration procedure 1000 shown in FIG. 10).

At 1114, the processing device may calculate the power consumption of the lighting fixture at various (e.g., each) color temperature between the endpoint warm-white color temperature value $T_{WW-END}$ and the endpoint cool-white color temperature value $T_{CW-END}$. The endpoint warm-white color temperature value $T_{WW-END}$ and the endpoint cool-white color temperature value $T_{CW-END}$ may be the fixture warm-white color temperature value $T_{WW}$ and the fixture cool-white color temperature value Tow of the lighting fixture, respectively (e.g., when the power-limiting mode configuration procedure 1100 is executed during manufacturing of the lighting fixture). The endpoint warm-white color temperature value $T_{WW-END}$ and the endpoint cool-white color temperature value $T_{CW-END}$ may be the room warm-white color temperature value $T_{WW-ROOM}$ and the room cool-white color temperature value $T_{CW-ROOM}$ of the lighting fixture, respectively (e.g., when the power-limiting mode configuration procedure 1100 is executed during or after commissioning of the lighting fixture). The processing device may calculate the power consumption at 1114 using power consumption information of individual light sources of the lighting fixture that are included in the fixture capability information.

At 1116, the processing device may identify the color temperature that resulted in the highest power consumption calculated at 1114. At 1118, the processing device may identify the highest intensity level at the identified color temperature that causes the power consumption to be less than or equal to the maximum power threshold $P_{MAX}$ (e.g., the highest power consumption to be less than or equal to the maximum power threshold $P_{MAX}$). At 1120, the processing device may set the intensity level identified at 1118 as the constant light intensity $L_{CNST}$ to which the lighting fixture may be controlled during normal operation, and the power-limiting mode configuration procedure 1100 may exit.

Figure 12:
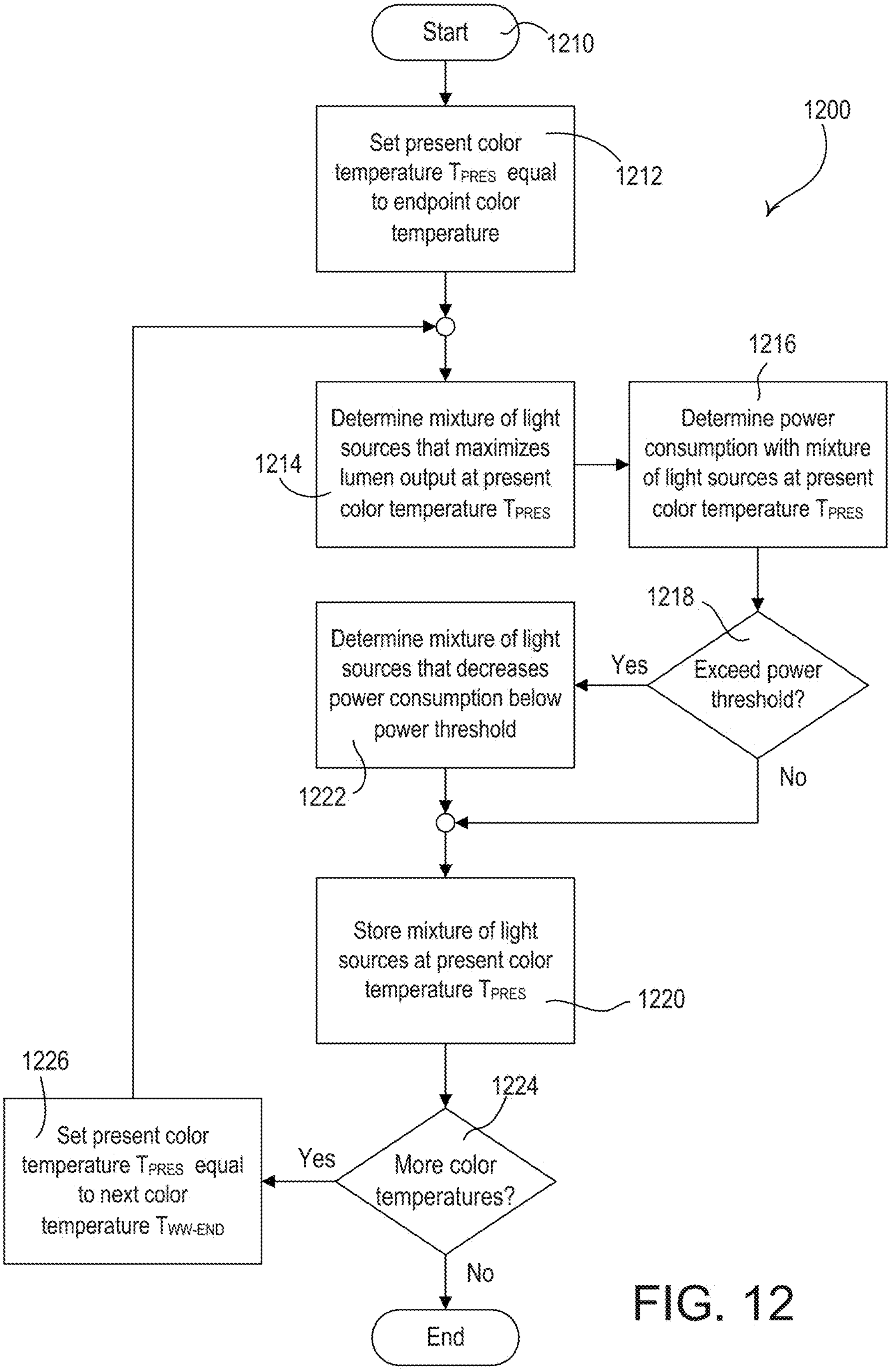
FIG. 12 is an example flowchart of a power-limiting mode configuration procedure for determining light intensities to which a lighting fixture may be controlled to limit the power consumption of the lighting fixture below a maximum power threshold.

FIG. 12 is an example flowchart of a power-limiting mode configuration procedure 1200 for determining light intensities to which a lighting fixture may be controlled to limit the power consumption of the lighting fixture below a maximum power threshold $P_{MAX}$. For example, the power-limiting mode configuration procedure 1200 may be executed by a processing device (e.g., the system controller 110, the system controller 310, and/or the processing device 320) during manufacturing of the lighting fixture and/or during commissioning of the load control system. The power-limiting mode configuration procedure 1200 may be executed, for example, to determine an intensity to which a lighting fixture may be controlled to maximize the light output while limiting the power consumption below the maximum power threshold $P_{MAX}$ at each color temperature between the endpoint warm-white color temperature value $T_{WW-END}$ and the endpoint cool-white color temperature value $T_{CW-END}$.

The power-limiting mode configuration procedure 1200 may start at 1210. At 1212, the processing device may set a present color temperature $T_{PRES}$ relatively equal to one of the endpoint color temperatures, e.g., the endpoint warm-white color temperature value $T_{WW-END}$ or the endpoint cool-white color temperature value $T_{CW-END}$. At 1214, the processing device may determine the mixture of light sources (e.g., the intensity of each light source in the lighting fixture) that maximizes the lumen output at the present color temperature $T_{PRES}$ (e.g., by stepping through all mixtures of light sources and calculating the lumen output at each mixture). At 1216, the processing device may determine the power consumption of the lighting fixture when the light sources are at the mixture of light intensities that maximizes the lumen output at the present color temperature $T_{PRES}$ (e.g., as determined at 1214). At 1218, the processing device may determine whether the power consumption determined at 1216 exceeds the maximum power threshold $P_{MAX}$. If the power consumption determined at 1216 does not exceed the maximum power threshold $P_{MAX}$ at 1218, the processing device may store the mixture of light sources determined at 1214 for the present color temperature $T_{PRES}$ in memory at 1220.

If the power consumption determined at 1216 exceeds the maximum power threshold $P_{MAX}$ at 1218, the processing device may determine a different mixture of light sources that decreases the power consumption below the maximum power threshold $P_{MAX}$ at 1222 and store the different mixture of light sources determined at 1214 for the present color temperature $T_{PRES}$ in memory at 1220. For example, the processing device may decrease the intensities of all of the light sources in the lighting fixture while maintaining the same mixture (e.g., same ratios) of the intensities of the light sources to maintain the same color until the power consumption falls below the maximum power threshold $P_{MAX}$ at 1222.

At 1224, the processing device may determine whether there are more color temperatures between the endpoint warm-white color temperature value $T_{WW-END}$ and the endpoint cool-white color temperature value $T_{CW-END}$ to process. If there are more color temperatures between the endpoint warm-white color temperature value $T_{WW-END}$ and the endpoint cool-white color temperature value $T_{CW-END}$ to process at 1224, the processing device may set the present color temperature $T_{PRES}$ relatively equal to the next color temperature at 1226 and determine the mixture of light sources that maximizes the lumen output at the present color temperature $T_{PRES}$ at 1214. If there are no more color temperatures to process at 1224, the power-limiting mode configuration procedure 1200 may end.

Figure 13:
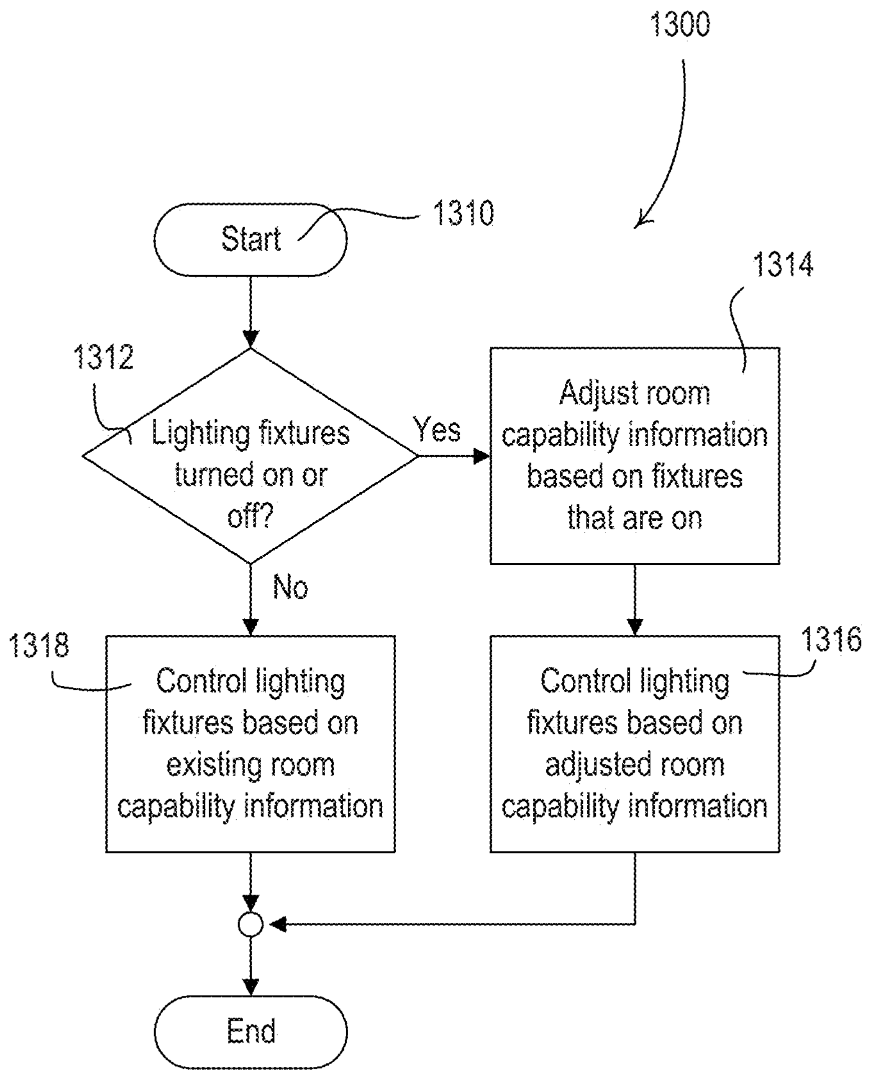
FIG. 13 is an example flowchart of a control procedure for controlling one or more lighting fixtures using room capability information, for example, by dynamically updating the room capability information.

FIG. 13 is an example flowchart of a control procedure 1300 for controlling one or more lighting fixtures using room capability information. For example, the control procedure 1300 may be executed by a system controller of a load control system (e.g., the system controller 110 of the load control system 100) during normal operation of the load control system. The control procedure 1300 may start at 1310, for example, when the system controller receives control instructions (e.g., a command for adjusting the intensity and/or color temperature of the lighting fixtures). If, at 1312, any lighting fixtures are to be turned on or turned off in response to the control instructions received at 1310, the system controller may adjust the room capability information based on the lighting fixtures that will be on after the execution of the control instructions at 1314.

At 1316, the system controller may control the lighting fixtures in response to the received control instructions based on the adjusted room capability information, and the control procedure 1300 may end. For example, the system controller may determine one or more commands for the lighting fixtures and transmit the commands to the lighting fixtures at 1316. If no lighting fixtures are changing state (e.g., from off to on or from on to off) at 1312, the system controller may control the lighting fixtures in response to the received control instructions based on the existing room capability information at 1318, and the control procedure 1300 may end.

Figure 14:
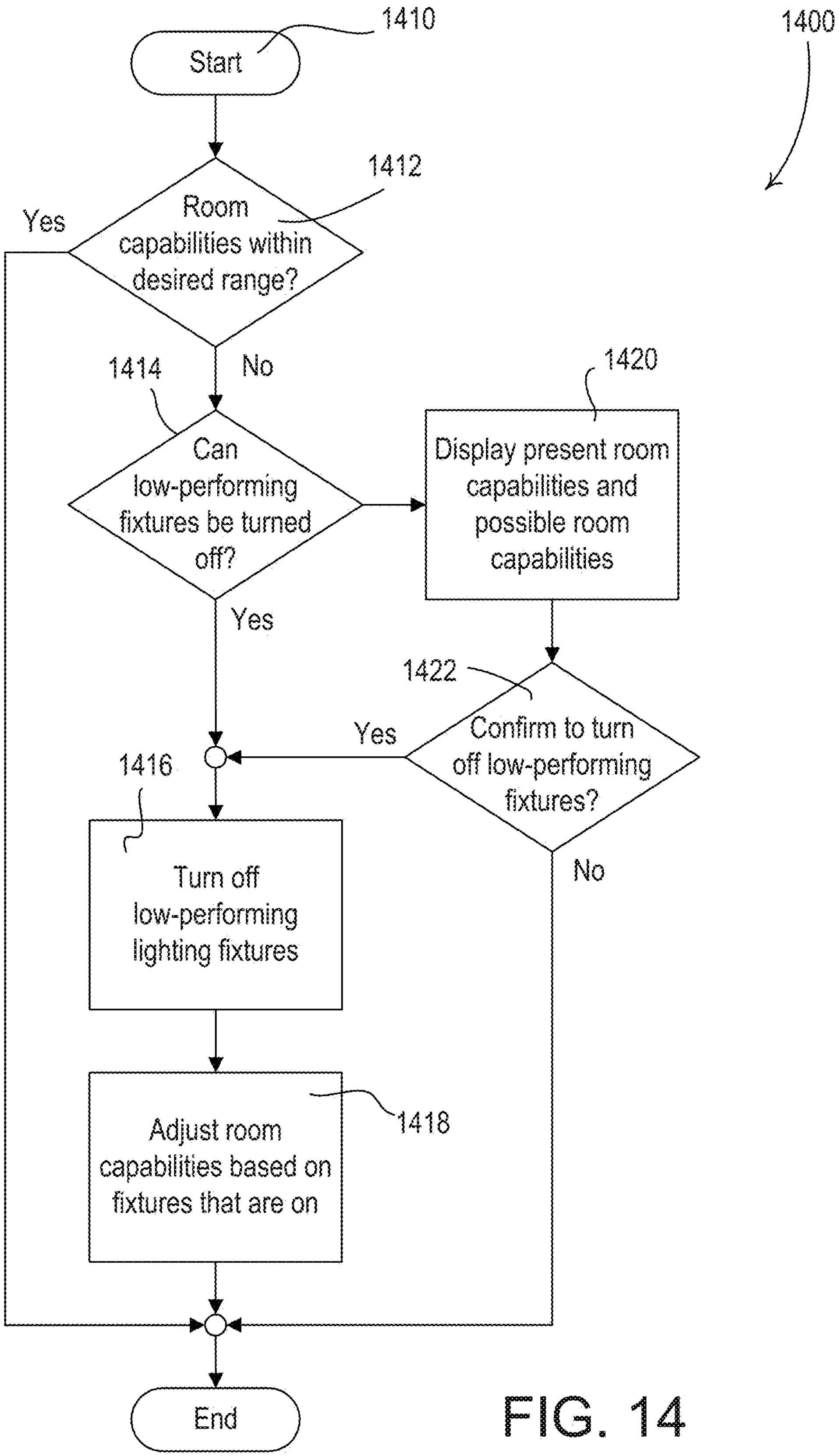
FIG. 14 is an example flowchart of a control procedure for controlling one or more lighting fixtures using room capability information, for example, to turn off low-performing lighting fixtures.

FIG. 14 is an example flowchart of a control procedure 1400 for controlling one or more lighting fixtures using room capability information. For example, the control procedure 1400 may be executed by a system controller of a load control system (e.g., the system controller 110 of the load control system 100) during normal operation of the load control system. The system controller may execute the control procedure 1400 periodically and/or in response to receiving control instructions (e.g., a command for adjusting the intensity and/or color temperature of the lighting fixtures). The control procedure 1400 may start at 1410. At 1412, the system controller may determine whether the present room capabilities are within a desired operating range. If the present room capabilities are within a desired operating range (e.g., if the present color temperature of the lighting fixtures as set by the room capability information is within a desired color temperature range) at 1412, the control procedure 1400 may exit.

If the present room capabilities are not within a desired operating range at 1412, the system controller may attempt to turn off low-performing lighting fixtures (e.g., lighting fixtures that have a small color temperature range or color gamut, and/or can only be controlled to a static color temperature or controlled according to a fixed color mixing curve). At 1414, the system controller may determine whether the low-performing lighting fixtures can be turned off without dropping below a minimum intensity. If the low-performing lighting fixtures can be turned off without dropping below a minimum intensity at 1414, the system controller may turn off the low-performing lighting fixtures at 1416 and adjust the room capability information based on the lighting fixtures that will be on after the execution of the control instructions at 1418, before the control procedure 1400 exits.

If the low-performing lighting fixtures cannot be turned off without dropping below a minimum intensity at 1414, the system controller may transmit a message to a network device (e.g., the mobile device 160 shown in FIG. 1) to cause the network device to display information regarding the present room capabilities and the possible room capabilities if the low-performing lighting fixtures are turned off at 1420. For example, the network device may visually display the present color temperature range (e.g., a limited color temperature range) and a possible color temperature range that may be achieved if the low-performing lighting fixtures are turned off based on the information received from the system controller. At 1420, the network device may also prompt the user to input whether the low-performing lighting fixtures may be turned off. If the system controller receives a confirmation that the low-performing lighting fixtures may be turned off at 1422, the system controller may turn off the low-performing lighting fixtures at 1416 and adjust the room capability information based on the lighting fixtures that will be on after the execution of the control instructions at 1418. If the system controller does not receive a confirmation that the low-performing lighting fixtures may be turned off at 1422, the control procedure 1400 may end.

Figure 15:
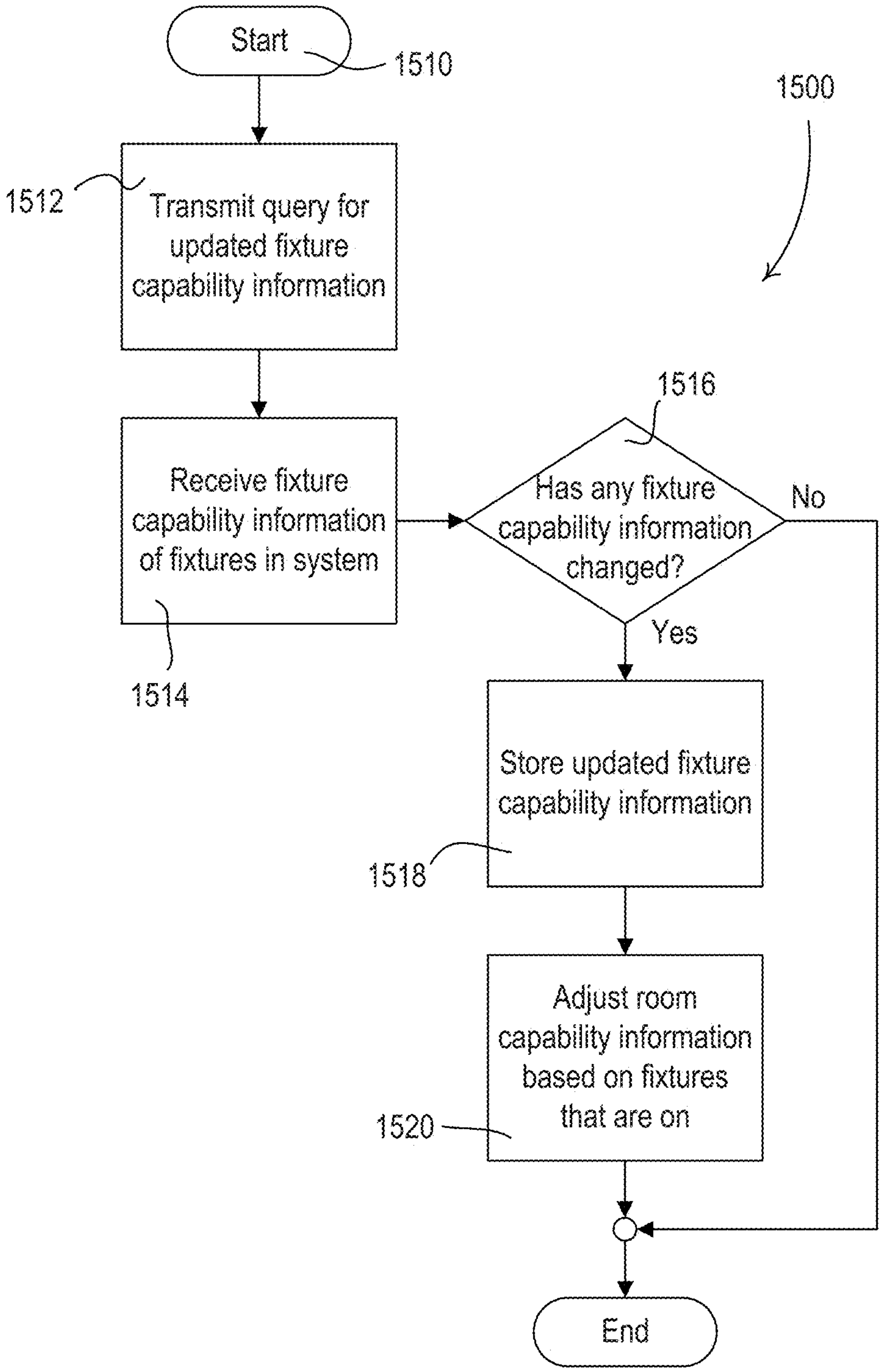
FIG. 15 is an example flowchart of an adjustment procedure for adjusting room capability information in response to updated fixture capability information from one or more lighting fixtures in a room.

FIG. 15 is an example flowchart of an adjustment procedure 1500 for adjusting room capability information in response to updated fixture capability information from one or more lighting fixtures in a room. For example, the adjustment procedure 1500 may be executed by a system controller of a load control system (e.g., the system controller 110 of the load control system 100) during normal operation of the load control system. The adjustment procedure 1500 may be executed, for example, periodically by the system controller to determine if the fixture capability information for one or more of the lighting fixtures in a room has changed (e.g., as the lighting fixtures age and/or in response to temperature changes). The adjustment procedure 1500 may start at 1510. The system controller may transmit a query for updated fixture capability information for lighting fixtures in a room at 1512, and may receive fixture capability information for one or more lighting fixtures in the room at 1514. For example, the system controller may be configured to receive the updated fixture capability information from the lighting fixtures, and/or from a measurement tool, such as, a permanently-installed fixture sensor (e.g., the measurement sensor 166) and/or a temporary measurement tool (e.g., the mobile measurement device 164).

At 1516, a determination may be made as to whether the fixture capability information has changed for any of the lighting fixtures. For example, the system controller may determine if one or more of the fixture capability metrics has changed by a predetermined amount (e.g., 5%) as compared to the previously-stored value for the fixture capability metric. If the fixture capability information has changed for one or more of the lighting fixtures at 1516, the system controller may store the updated fixture capability information at 1518 and adjust the room capability information for the room based on the updated fixture capability information at 1520, before the adjustment procedure 1500 ends. If the fixture capability information has not changed for the lighting fixtures in the room at 1516, the adjustment procedure 1500 may simply exit.

Figure 16:
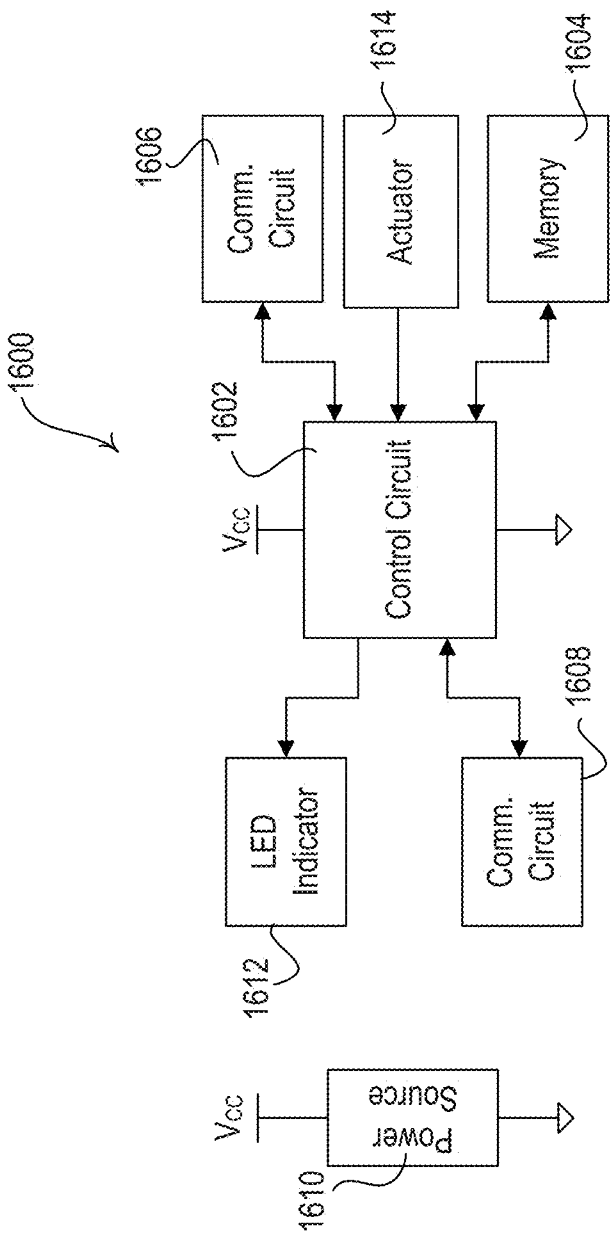
FIG. 16 illustrates a block diagram of an example system controller.

FIG. 16 is a block diagram illustrating an example system controller 1600 as described herein. The system controller 1600 may include a control circuit 1602 for controlling the functionality of the system controller 1600. The control circuit 1602 may include one or more general purpose processors, special purpose processors, conventional processors, digital signal processors (DSPs), microprocessors, integrated circuits, a programmable logic device (PLD), application specific integrated circuits (ASICs), or the like. The control circuit 1602 may perform signal coding, data processing, power control, input/output processing, or any other functionality that enables the system controller 1600 to perform as described herein. The control circuit 1602 may store information in and/or retrieve information from the memory 1604. The memory 1604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1600 may include a communications circuit 1606 for transmitting and/or receiving information. The communications circuit 1606 may perform wireless and/or wired communications. The system controller 1600 may also, or alternatively, include a communications circuit 1608 for transmitting and/or receiving information. The communications circuit 1606 may perform wireless and/or wired communications. The communications circuits 1606 and 1608 may be in communication with control circuit 1602. The communications circuits 1606 and 1608 may include RF transceivers or other communications modules capable of transmitting and/or receiving wireless communications via one or more antennas. The communications circuit 1606 and communications circuit 1608 may be capable of transmitting and/or receiving communications via the same communication channels or different communication channels. For example, the communications circuit 1606 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1608 may be capable of communicating (e.g., with control devices and/or other devices in the load control system) via another wireless communication channel (e.g., WI-FI® or a proprietary communication channel, such as CLEAR CONNECT™).

The control circuit 1602 may be coupled to an LED indicator 1612 for providing indications to a user. The control circuit 1602 may be coupled to an actuator 1614 (e.g., one or more buttons) that may be actuated by a user to communicate user selections to the control circuit 1602. For example, the actuator 1614 may be actuated to put the control circuit 1602 in an association mode and/or communicate association messages from the system controller 1600.

Each of the modules within the system controller 1600 may be powered by a power source 1610. The power source 1610 may include an alternating-current (AC) power supply or a direct-current (DC) power supply. For example, the power source 1610 may be any one of: a line voltage AC power source, a battery, Power over Ethernet, Universal Serial Bus, or the like. The power source 1610 may generate a supply voltage $V_{CC}$ for powering the modules within the system controller 1600.

In addition to controlling fixtures and room capabilities for a single room as described herein, the system controller 1600 may additionally control fixtures in multiple rooms. The fixtures controlled by the system controller 1600 may not be limited to ceiling-mounted fixtures but additionally may include: wall sconces, lamps, task lighting, mood lighting, decorative lighting, emergency lighting, and the like.

The invention claimed is:

1. A lighting system controller, comprising:
- memory circuitry;
- first communication interface circuitry;
- control circuitry to:
  - receive, via the first communication interface circuitry, a fixture capability parameter from each of a plurality of networked lighting fixtures disposed in a space;
  - cause a storage in the memory circuitry of the fixture capability parameter received from each of the plurality of networked lighting fixtures to provide a plurality of fixture capability parameters;
  - identify, as a space capability parameter, an overlapping range of fixture capability parameters shared across the plurality of fixture capability parameters;
  - receive an input indicative of a target lighting value in the space;
  - determine whether a component of the target lighting value falls within the identified space capability parameter; and
  - responsive to the determination that the component of the target lighting value does not fall within the space capability parameter:
    - determine a modified space capability parameter using the fixture capability parameter associated with a group of lighting fixtures included in the plurality of networked lighting fixtures such that the component of the target lighting value falls within the modified space capability parameter;
    - cause the lighting fixtures not included in the group of lighting fixtures to enter a non-illuminated state; and
    - cause the group of lighting fixtures to enter an illuminated state to provide the target lighting value in the space.

2. The lighting system controller of claim 1, the control circuitry to further:
- responsive to the determination that the component of the target lighting values falls within the space capability parameter:
  - cause the plurality of networked lighting fixtures to enter an illuminated state to provide the target lighting value in the space.

3. The lighting system controller of claim 1 further comprising:
- user input interface circuitry;
  - wherein to receive the input indicative of the target lighting value in the space, the control circuitry to further:
    - receive, via the user input interface circuitry the input indicative of the target lighting value in the space.

4. The lighting system controller of claim 1 further comprising:
- second communication interface circuitry;
  - wherein to receive the input indicative of the target lighting value in the space, the control circuitry to further:
    - receive, via the second communication interface circuitry the input indicative of the target lighting value in the space.

5. The lighting system controller of claim 1 wherein to receive the fixture capability parameter from each of the plurality of networked lighting fixtures disposed in the space via the first communication interface circuitry, the control circuitry to further:
- poll each of the plurality of networked lighting fixtures via the first communication interface circuitry; and
- responsive to the poll of each of the plurality of networked lighting fixtures, receive the fixture capability parameter from each of the plurality of networked lighting fixtures via the first communication interface circuitry.

6. The lighting system controller of claim 1 wherein to receive the fixture capability parameter from each of the plurality of networked lighting fixtures disposed in the space via the first communication interface circuitry, the control circuitry to further:
- receive the fixture capability parameter from a new lighting fixture via the first communication interface circuitry responsive to communicatively coupling the new lighting to the plurality of networked lighting fixtures;
- cause a storage in the memory circuitry of the fixture capability parameter received from the new lighting fixture; and
- identify, a new overlapping range shared across the plurality of fixture capability parameters that includes the fixture capability parameter of the new lighting fixture as a new space capability parameter.

7. The lighting system controller of claim 1 wherein to receive the fixture capability parameter from each of the plurality of networked lighting fixtures disposed in the space via the first communication interface circuitry, the control circuitry to further:
- receive the fixture capability parameter from a replacement lighting fixture via the first communication interface circuitry responsive to communicatively coupling the replacement lighting fixture to the plurality of networked lighting fixtures;
- removing, the fixture capability parameter associated with the replaced lighting fixture from the plurality of networked lighting fixtures;
- cause a storage in the memory circuitry of the fixture capability parameter received from the replacement lighting fixture; and
- identify, a new overlapping range shared across the plurality of fixture capability parameters that includes the fixture capability parameter of the replacement lighting fixture as a new space capability parameter.

8. The lighting system controller of claim 1 wherein to receive the fixture capability parameter from each of the plurality of networked lighting fixtures via the first communication interface circuitry, the control circuitry to further:

receive, at least one of the following from each of the plurality of networked lighting fixtures:

a dimming range of the respective lighting fixture;

a color temperature range of the respective lighting fixture;

a maximum color temperature of the respective lighting fixture;

a minimum color temperature of the respective lighting fixture;

a color gamut of the respective lighting fixture;

a spectral power distribution of the respective lighting fixture;

a power range of the respective lighting fixture;

a dimming curve for the respective lighting fixture;

a color mix curve for the respective lighting fixture;

a color temperature curve for the respective lighting fixture;

a lumen range for each source included in the respective lighting fixture; or a power consumption for each source included in the respective lighting fixture.

9. A lighting system control method, comprising:

receiving, by lighting control circuitry, a fixture capability parameter from each of a plurality of networked lighting fixtures disposed in a space via communicatively coupled first communication interface circuitry;

causing, by the lighting control circuitry, a storage in memory circuitry of the fixture capability parameter received from each of the plurality of networked lighting fixtures to provide a plurality of fixture capability parameters;

identifying, by the lighting control circuitry, as a space capability parameter, an overlapping range of fixture capability parameters shared across the plurality of fixture capability parameters;

receiving, by the lighting control circuitry, an input indicative of a target lighting value in the space;

determining, by the lighting control circuitry, whether a component of the target lighting value falls within the identified space capability parameter; and responsive to the determination by the lighting control circuitry that the component of the target lighting value does not fall within the identified space capability parameter:

determining, by the lighting control circuitry, a modified space capability parameter using the fixture capability parameter associated with a group of lighting fixtures included in the plurality of networked lighting fixtures such that the component of the target lighting value falls within the modified space capability parameter;

causing, by the lighting control circuitry, the lighting fixtures not included in the group of lighting fixtures to enter a non-illuminated state; and causing, by the lighting control circuitry, the group of lighting fixtures to enter an illuminated state to provide the target lighting value in the space.

10. The method of claim 9, further comprising:

responsive to the determination by the lighting control circuitry that the component of the target lighting values falls within the space capability parameter:

causing, by the lighting control circuitry, the plurality of networked lighting fixtures to enter an illuminated state to provide the target lighting value in the space.

11. The method of claim 9, wherein receiving the input indicative of the target lighting value in the space, further comprises:

receiving, by the lighting control circuitry, the input indicative of the target lighting value in the space via communicatively coupled user input interface circuitry.

12. The method of claim 9, wherein receiving the input indicative of the target lighting value in the space, further comprises:

receiving, by the lighting control circuitry, the input indicative of the target lighting value in the space via communicatively coupled second communication interface circuitry.

13. The method of claim 9 wherein receiving the fixture capability parameter from each of the plurality of networked lighting fixtures disposed in the space via the first communication interface circuitry further comprises:

polling, by the lighting control circuitry, each of the plurality of networked lighting fixtures; and receiving, by the lighting control circuitry, the fixture capability parameter from each of the plurality of networked lighting fixtures via the first communication interface circuitry responsive to the poll of each of the plurality of networked lighting fixtures.

14. The method of claim 9 wherein receiving the fixture capability parameter from each of the plurality of networked lighting fixtures disposed in the space via the first communication interface circuitry further comprises:

receiving, by the lighting control circuitry, the fixture capability parameter from a new lighting fixture via the first communication interface circuitry responsive to communicatively coupling the new lighting to the plurality of networked lighting fixtures;

causing, by the lighting control circuitry, a storage in the memory circuitry of the fixture capability parameter received from the new lighting fixture; and identifying, by the lighting control circuitry, an overlapping range shared across the plurality of fixture capability parameters that includes the fixture capability parameter of the new lighting fixture as a new space capability parameter.

15. The method of claim 9 wherein receiving, the fixture capability parameter from each of the plurality of networked lighting fixtures disposed in the space via the first communication interface circuitry further comprises:

receiving, by the lighting control circuitry, the fixture capability parameter from a replacement lighting fixture via the first communication interface circuitry responsive to communicatively coupling the replacement lighting fixture to the plurality of networked lighting fixtures;

removing, by the lighting control circuitry, the fixture capability parameter associated with the replaced lighting fixture from the plurality of networked lighting fixtures;

causing, by the lighting control circuitry, a storage in the memory circuitry of the fixture capability parameter received from the replacement lighting fixture; and identifying, by the lighting control circuitry, an overlapping range shared across the plurality of fixture capability parameters that includes the fixture capability parameter of the replacement lighting fixture as a new space capability parameter.

16. The method of claim 9 wherein receiving the fixture capability parameter from each of the plurality of networked lighting fixtures via the first communication interface circuitry further comprises:

receiving, by the lighting control circuitry, at least one of the following from each of the plurality of networked lighting fixtures:

a dimming range of the respective lighting fixture;

a color temperature range of the respective lighting fixture;

a maximum color temperature of the respective lighting fixture;

a minimum color temperature of the respective lighting fixture;

a color gamut of the respective lighting fixture;

a spectral power distribution of the respective lighting fixture;

a power range of the respective lighting fixture;

a dimming curve for the respective lighting fixture;

a color mix curve for the respective lighting fixture;

a color temperature curve for the respective lighting fixture;

a lumen range for each source included in the respective lighting fixture; or a power consumption for each source included in the respective lighting fixture.

17. A non-transitory, machine-readable, storage device that includes instructions that, when executed by lighting control circuitry, cause the lighting control circuitry to:

receive a fixture capability parameter from each of a plurality of networked lighting fixtures disposed in a space via communicatively coupled first communication interface circuitry;

cause a storage in memory circuitry of the fixture capability parameter received from each of the plurality of networked lighting fixtures to provide a plurality of fixture capability parameters;

identify as a space capability parameter, an overlapping range of fixture capability parameters shared across the plurality of fixture capability parameters;

receive an input indicative of a target lighting value in the space;

determine whether a component of the target lighting value falls within the identified space capability parameter; and responsive to the determination by the lighting control circuitry that the component of the target lighting value does not fall within the identified space capability parameter:

determine a modified space capability parameter using the fixture capability parameter associated with a group of lighting fixtures included in the plurality of networked lighting fixtures such that the component of the target lighting value falls within the modified space capability parameter;

cause the lighting fixtures not included in the group of lighting fixtures to enter a non-illuminated state; and cause the group of lighting fixtures to enter an illuminated state to provide the target lighting value in the space.

18. The non-transitory, machine-readable, storage device of claim 17 wherein the instructions, when executed by the lighting control circuitry, further cause the lighting control circuitry to:

responsive to the determination by the lighting control circuitry that the component of the target lighting values falls within the space capability parameter:

cause the plurality of networked lighting fixtures to enter an illuminated state to provide the target lighting value in the space.

19. The non-transitory, machine-readable, storage device of claim 17 wherein the instructions that cause the lighting control circuitry to receive the input indicative of the target lighting value in the space further cause the lighting control circuitry to:

receive the input indicative of the target lighting value in the space via communicatively coupled user input interface circuitry.

20. The non-transitory, machine-readable, storage device of claim 17, wherein the instructions that cause the lighting control circuitry to receive the input indicative of the target lighting value in the space further cause the lighting control circuitry to:

receive the input indicative of the target lighting value in the space via communicatively coupled second communication interface circuitry.

21. The non-transitory, machine-readable, storage device of claim 17 wherein the instructions that cause the lighting control circuitry to receive the fixture capability parameter from each of the plurality of networked lighting fixtures disposed in the space via the first communication interface circuitry further cause the lighting control circuitry to:

poll each of the plurality of networked lighting fixtures; and receive the fixture capability parameter from each of the plurality of networked lighting fixtures via the first communication interface circuitry responsive to the poll of each of the plurality of networked lighting fixtures.

22. The non-transitory, machine-readable, storage device of claim 17 wherein the instructions that cause the lighting control circuitry to receive the fixture capability parameter from each of the plurality of networked lighting fixtures disposed in the space via the first communication interface circuitry further cause the lighting control circuitry to:

receive the fixture capability parameter from a new lighting fixture via the first communication interface circuitry responsive to communicatively coupling the new lighting to the plurality of networked lighting fixtures;

cause a storage in the memory circuitry of the fixture capability parameter received from the new lighting fixture; and identify an overlapping range shared across the plurality of fixture capability parameters that includes the fixture capability parameter of the new lighting fixture as a new space capability parameter.

23. The non-transitory, machine-readable, storage device of claim 17 wherein the instructions that cause the lighting control circuitry to receive the fixture capability parameter from each of the plurality of networked lighting fixtures disposed in the space via the first communication interface circuitry further cause the lighting control circuitry to:

receive the fixture capability parameter from a replacement lighting fixture via the first communication interface circuitry responsive to communicatively coupling the replacement lighting fixture to the plurality of networked lighting fixtures;

remove the fixture capability parameter associated with the replaced lighting fixture from the plurality of networked lighting fixtures;

cause a storage in the memory circuitry of the fixture capability parameter received from the replacement lighting fixture; and identify an overlapping range shared across the plurality of fixture capability parameters that includes the fixture capability parameter of the replacement lighting fixture as a new space capability parameter.

24. The non-transitory, machine-readable, storage device of claim 17 wherein the instructions that cause the lighting control circuitry to receive the fixture capability parameter from each of the plurality of networked lighting fixtures via the first communication interface circuitry further cause the lighting control circuitry to:

receive at least one of the following from each of the plurality of networked lighting fixtures:

a dimming range of the respective lighting fixture;

a color temperature range of the respective lighting fixture;

a maximum color temperature of the respective lighting fixture;

a minimum color temperature of the respective lighting fixture;

a color gamut of the respective lighting fixture;

a spectral power distribution of the respective lighting fixture;

a power range of the respective lighting fixture;

a dimming curve for the respective lighting fixture;

a color mix curve for the respective lighting fixture;

a color temperature curve for the respective lighting fixture;

a lumen range for each source included in the respective lighting fixture; or a power consumption for each source included in the respective lighting fixture.

* * * * *